(12) United States Patent
Yamaguchi et al.

(10) Patent No.: US 8,775,025 B2
(45) Date of Patent: Jul. 8, 2014

(54) STEERING SYSTEM

(75) Inventors: Takuya Yamaguchi, Saitama (JP);
Yoshimitsu Akuta, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 957 days.

(21) Appl. No.: 12/551,993

(22) Filed: Sep. 1, 2009

(65) Prior Publication Data

US 2010/0070137 A1 Mar. 18, 2010

(30) Foreign Application Priority Data

Sep. 2, 2008 (JP) ................................. 2008-224894

(51) Int. Cl.
*B62D 6/00* (2006.01)

(52) U.S. Cl.
USPC ................ 701/41; 701/36; 701/42; 701/43; 701/44; 180/446

(58) Field of Classification Search
None
See application file for complete search history.

(56) References Cited

U.S. PATENT DOCUMENTS

| | | | | |
|---|---|---|---|---|
| 4,957,181 | A * | 9/1990 | Oshita et al. | 180/446 |
| 5,423,391 | A * | 6/1995 | Shimizu | 180/446 |
| 5,752,209 | A * | 5/1998 | Nishimoto et al. | 701/41 |
| 6,032,756 | A * | 3/2000 | Nishimura et al. | 180/446 |
| 6,832,144 | B2 * | 12/2004 | Momiyama et al. | 701/41 |
| 6,883,637 | B2 * | 4/2005 | Nishizaki et al. | 180/446 |
| 6,999,862 | B2 * | 2/2006 | Tamaizumi et al. | 701/41 |
| 7,055,645 | B2 * | 6/2006 | Kato et al. | 180/443 |
| 7,177,745 | B2 * | 2/2007 | Tsuchiya | 701/41 |
| 7,392,878 | B2 * | 7/2008 | Ono et al. | 180/421 |
| 7,584,819 | B2 * | 9/2009 | Hidaka | 180/444 |
| 7,721,841 | B2 * | 5/2010 | Shibata | 180/407 |
| 7,792,619 | B2 * | 9/2010 | Uryu | 701/41 |
| 7,793,754 | B2 * | 9/2010 | Shimizu et al. | 180/446 |
| 7,937,200 | B2 * | 5/2011 | Shimizu et al. | 701/41 |
| 8,086,374 | B2 * | 12/2011 | Yamaguchi et al. | 701/42 |
| 8,175,772 | B2 * | 5/2012 | Onuma | 701/41 |

(Continued)

FOREIGN PATENT DOCUMENTS

| | | |
|---|---|---|
| EP | 1 380 491 A2 | 1/2004 |
| EP | 1 380 491 A3 | 11/2004 |

(Continued)

OTHER PUBLICATIONS

Notice of Reason for Rejection (2008-224894)from Japan Patent Office (Japanese).

*Primary Examiner* — Khoi Tran
*Assistant Examiner* — Jonathan L Sample
(74) *Attorney, Agent, or Firm* — Arent Fox LLP

(57) ABSTRACT

An object of the present invention is to provide a steering system which does not cause the driver to feel the steering reactive force shock when the operation of the steering wheel is stopped, and which enables the driver to operate the steering wheel comfortably. In order to achieve the above object, there is provided a steering system in which a transfer ratio of a steering angle of a steering wheel to a turning angle of a turning wheel is changed by a variable transfer ratio mechanism, and an auxiliary power is generated during steering by an electric power steering, including: a transfer ratio variable motor for changing the transfer ratio, in which a steering angular velocity of the steering wheel is calculated, and when an absolute value of the steering angular velocity becomes equal to or less than a predetermined value, a current value flowing through the transfer ratio variable motor is set to zero.

4 Claims, 15 Drawing Sheets

(56) References Cited

U.S. PATENT DOCUMENTS

| | | | |
|---|---|---|---|
| 8,200,392 B2* | 6/2012 | Kodaira et al. | 701/41 |
| 2002/0033300 A1* | 3/2002 | Takeuchi et al. | 180/446 |
| 2003/0058589 A1* | 3/2003 | Matsumoto et al. | 361/23 |
| 2004/0068353 A1* | 4/2004 | Momiyama et al. | 701/41 |
| 2004/0140148 A1* | 7/2004 | Nishizaki et al. | 180/443 |
| 2005/0071061 A1* | 3/2005 | Kato et al. | 701/41 |
| 2005/0080532 A1* | 4/2005 | Kato et al. | 701/41 |
| 2005/0103561 A1* | 5/2005 | Endo et al. | 180/443 |
| 2005/0167181 A1* | 8/2005 | Kato et al. | 180/443 |
| 2005/0205344 A1* | 9/2005 | Uryu | 180/446 |
| 2005/0240327 A1* | 10/2005 | Kato et al. | 701/41 |
| 2006/0090953 A1* | 5/2006 | Shimizu et al. | 180/446 |
| 2007/0055426 A1* | 3/2007 | Hara et al. | 701/41 |
| 2007/0107977 A1* | 5/2007 | Shibata | 180/444 |
| 2007/0193818 A1* | 8/2007 | Hidaka | 180/421 |
| 2007/0284180 A1* | 12/2007 | Suehiro et al. | 180/444 |
| 2009/0032327 A1* | 2/2009 | Yasuda | 180/443 |
| 2009/0105907 A1* | 4/2009 | Yamaguchi et al. | 701/41 |
| 2009/0118905 A1* | 5/2009 | Takenaka et al. | 701/41 |
| 2009/0120714 A1* | 5/2009 | Hisanaga et al. | 180/446 |
| 2010/0161178 A1* | 6/2010 | Kodaira et al. | 701/41 |
| 2012/0312627 A1* | 12/2012 | Morishita et al. | 180/446 |

FOREIGN PATENT DOCUMENTS

| | | |
|---|---|---|
| EP | 2 050 653 A1 | 4/2009 |
| JP | 2005-295688 | 10/2005 |
| JP | 2006-111232 | 4/2006 |

* cited by examiner

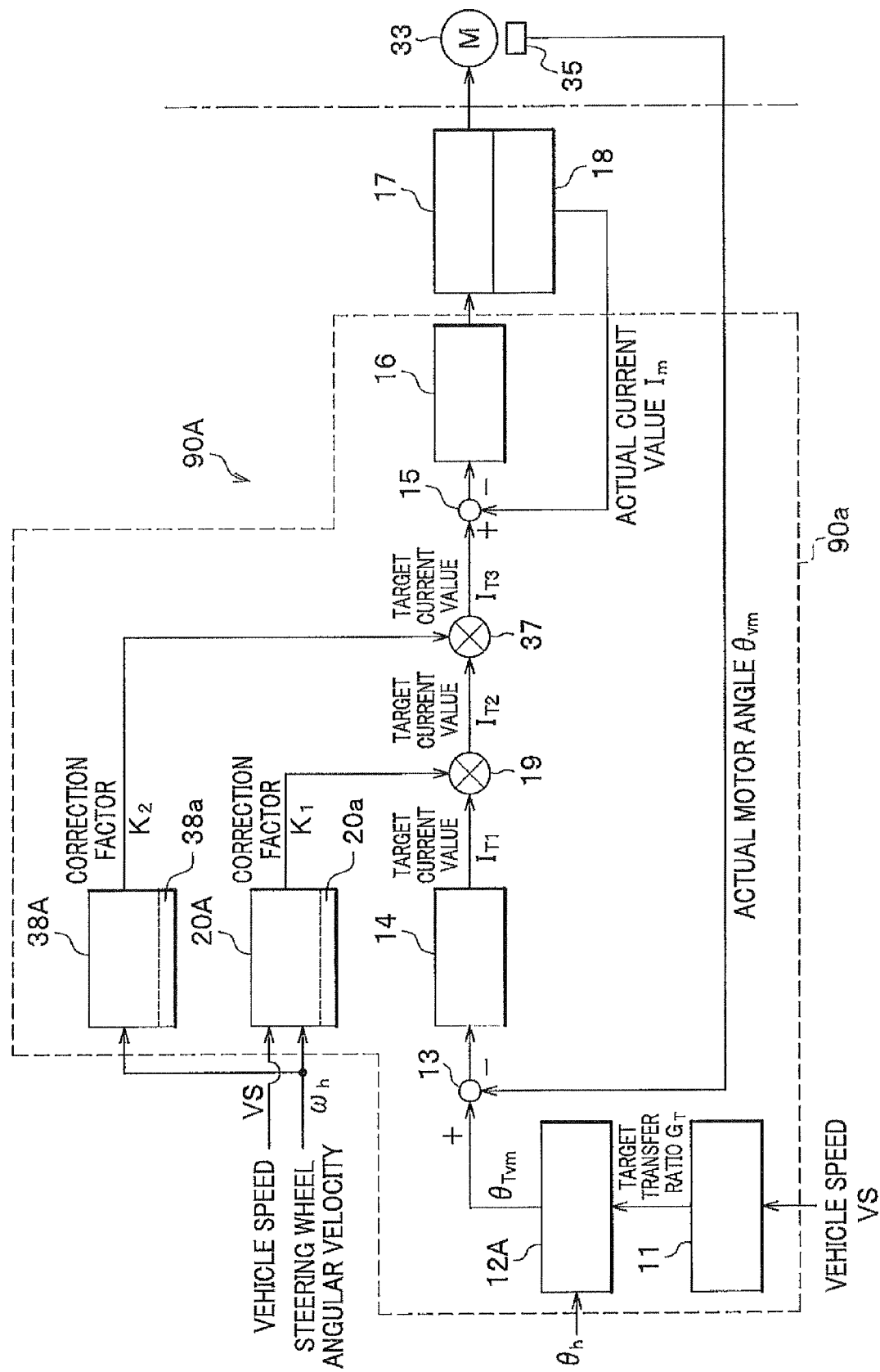

STEERING SYSTEM

CROSS REFERENCE TO RELATED APPLICATIONS

The present application claims benefit of the filing date of Japanese patent application No. 2008-224894 filed on Sep. 2, 2008, which is incorporated herein by reference.

FIELD OF THE INVENTION

The present invention relates to a steering system which changes a transfer ratio of a steering angle of a steering wheel to a turning angle of a turning wheel by a variable transfer ratio mechanism and generates auxiliary power during steering by an electric power steering unit.

DESCRIPTION OF THE RELATED ART

Heretofore, a steering system having a variable transfer ratio mechanism and an electric power steering unit has been proposed. The variable transfer ratio mechanism enables a driver to largely turn a turning wheel with less steering operation by setting a transfer ratio (=an angle of steering wheel/ angle of turning wheel) to be small (by quickening the ratio) in a low vehicle speed range during parking and the like, so that the mechanism can reduce a burden of operation of the driver and improve convenience in driving.

The variable transfer ratio mechanism also enables yaw rate response characteristics and vehicle traveling stability to be improved by setting the transfer ratio to be large (by slowing the ratio) in a high vehicle speed range because the turning wheel is turned less even if the driver largely steers the steering wheel. The electric power steering unit also enables the driver to turn the turning wheel with less steering operation because the unit generates steering auxiliary power.

If the driver tries to turn the steering wheel quickly when the ratio is quickened in the low vehicle speed range, the steering wheel of the steering system provided with such variable transfer ratio mechanism and electric power steering unit may become difficult to turn because deficiency of auxiliary power occurs due to an influence of counter electromotive voltage of an EPS (Electric Power Steering) motor, i.e., a power source of the electric power steering unit, even though the electric power steering unit tries to generate the auxiliary power so as to be able to turn the turning wheel largely and quickly.

Then, there has been proposed a method for avoiding the steering wheel from becoming difficult to turn by changing a target transfer ratio, i.e., a target value of the transfer ratio, in real time so that the transfer ratio is changed in a direction of slowing down the ratio in such a case as disclosed in, for example, JP 2000-344120 A.

Still more, when the driver turns the steering wheel with large steering speed and when an actual transfer ratio cannot quickly follow up the target transfer ratio due to an output torque of the transfer ratio variable motor used in the variable transfer ratio mechanism, the driver may possibly feel a sense of discomfort in operating the steering wheel as if the turn of the turning wheel continues in a previous steering direction even after finishing the operation of the steering wheel.

As a solution, the applicant proposed a method for solving the above problems in a third embodiment of Japanese Patent Application No. 2008-156231 (not yet open to the public). The method will be explained as a comparative example with reference to FIGS. 12-15.

FIG. 12 corresponds to FIG. 1 of Japanese Patent Application No. 2008-156231, and a steering system 1 is provides with a steering wheel 2, a rack & pinion mechanism 3, an electric power steering unit 4, and a variable transfer ratio mechanism 5.

The electric power steering unit 4 has a torque sensor 21 for detecting a steering torque applied to a rotary shaft 2a of the steering wheel 2, an EPS motor 23 for driving a rack which changes the turning angle of the turning wheel and generates the auxiliary power, an EPS ECU 25 for controlling and driving the EPS motor 23.

The variable transfer ratio mechanism 5 has a differential mechanism 31 linked respectively with the rotary shaft 2a of the steering wheel 2 and the rack & pinion mechanism 3, a transfer ratio variable motor 33 for turning an external gear 44 linked with a carrier 43 of a differential mechanism 31 via an output gear 45 to change a transfer ratio of a steering angle of the steering wheel 2 (referred to as a "steering wheel angle" hereinafter) to the turning angle of the turning wheel, and a variable transfer ratio mechanism controlling ECU 9 for driving and controlling the transfer ratio variable motor 33.

The torque sensor 21 is provided between the steering wheel 2 and the differential mechanism 31 to detect the steering torque applied to the steering wheel 2 and inputs a steering torque value $T_h$ to the EPS ECU 25. The steering torque value $T_h$ measured by the torque sensor 21 is also input to a variable transfer ratio mechanism controlling ECU 9A. Specifically, the steering torque value $T_h$ is input to a variable transfer ratio mechanism controlling ECU 9A through a communication line 10 connected between the variable transfer ratio mechanism controlling ECU 9A and the EPS ECU 25.

The steering torque value $T_h$ is utilized for determining a direction and magnitude of the auxiliary power, specifically, an EPS indicator current, in the EPS ECU 25. In a driving circuit (not shown) for driving the EPS motor 23 included in the EPS ECU 25, an EPS indicator Duty is generated based on the EPS indicator current for driving the EPS motor 23 by PWM (Pulse Width Modulation).

A 2-stage planetary gear is used for the differential mechanism 31 of the variable transfer ratio mechanism 5. The rotary shaft 2a of the steering wheel 2 is connected to an upper-stage sun gear 41A, and a pinion shaft 3a is connected to a lower-stage sun gear 41B. A planetary gear 42A engaged with the upper-stage sun gear 41A is linked to a planetary gear 42B engaged with the lower-stage sun gear 41B via a common rotary shaft, and the rotary shaft is supported by a bearing of the carrier 43. The carrier 43 is extended radially outward, and is further extended toward the rotary shaft 2a of the steering wheel 2 to be connected to the external gear 44 rotatably supported by the rotary shaft 2a of the steering wheel 2. The external gear 44 is engaged with the output gear 45 fixed to a rotor axis of the transfer ratio variable motor 33.

As shown in FIG. 12, the output gear 45 of the transfer ratio variable motor 33 for rotating the carrier 43 of the differential mechanism 31 is a simple spur gear, and is engaged with the spur gear of the external gear 44 linked to the carrier 43.

The transfer ratio variable motor 33 is provided with a motor angle sensor 35 for detecting a rotational angle $\theta_{vm}$ of its rotor shaft (referred to as an "actual motor angle" hereinafter) and its signal is input to the variable transfer ratio mechanism controlling ECU 9.

The variable transfer ratio mechanism controlling ECU 9 uses the pinion angle $\theta_p$ that is a rotational angle of the pinion shaft 3a uniquely corresponding to the turning angle, instead of the turning angle, when the ratio G of the steering wheel angle $\theta_h$ of the steering wheel 2 to the turning angle of the turning wheel is set. To that end, a pinion angle sensor 7 for detecting the pinion angle $\theta_p$ is provided in a gear box (not shown) which houses the rack & pinion mechanism 3, and its signal is input to the variable transfer ratio mechanism controlling ECU 9.

In addition, according to an Equation (1) described below, the pinion angle $\theta_p$ may be calculated from the steering wheel angle $\theta_h$ and the actual motor angle $\theta_{vm}$.

Still more, vehicle speed VS obtained by a vehicle speed sensor (not shown) is input to the variable transfer ratio mechanism controlling ECU 9 through, for example, the communication line 10.

Then, as shown in FIG. 2, the variable transfer ratio mechanism controlling ECU 9 sets the target transfer ratio $G_T$ to be small (quicken the ratio) when the vehicle speed VS is in the low vehicle speed range and to be large (slow the ratio) when the vehicle speed VS is in the high vehicle speed range and controls a target current value for controlling the current flowing through the transfer ratio variable motor 33 so that the transfer ratio coincides with the target transfer ratio $G_T$.

The steering wheel 2 is linked to the variable transfer ratio mechanism 5 and the rotation of the pinion shaft 3a output from the variable transfer ratio mechanism 5 is linked with the assistance of rotation of the pinion shaft 3a given by the electric power steering unit 4, so that it is possible to increase or decrease the pinion angle $\theta_p$ by superimposing the actual motor angle $\theta_{vm}$ of the transfer ratio variable motor 33 to the steering wheel angle $\theta_h$. The following relationship holds among the pinion angle $\theta_p$, the steering wheel angle $\theta_h$ and the actual motor angle $\theta_{vm}$ due to the mechanical restriction:

$$\theta_p = \alpha * \theta_h + \beta * \theta_{vm} \qquad (1)$$

where, $\alpha$ and $\beta$ are constants.

Then, the transfer ratio G is defined by the following equation:

$$G = \theta_h / \theta_p \qquad (2)$$

Accordingly, the target pinion angle $\theta_{TP}$ is expressed by the target transfer ratio $G_T$ and the steering wheel angle $\theta_h$ at that time, as follows:

$$\theta_{TP} = (1/G_T)\theta_h \qquad (3)$$

Then, the target motor angle $\theta_{Tvm}$ of the transfer ratio variable motor 33 is calculated by the following equation by substituting $\theta_{TP}$ of the Equation (3) instead of $\theta_p$ of the Equation (1):

$$\theta_{Tvm} = (1/\beta) * \{(1/G_T) - \alpha\}\theta_h \qquad (4)$$

Next, with reference to FIGS. 4A and 4B, FIG. 13, and FIG. 14 (FIGS. 4A and 4B, FIG. 13, and FIG. 14 correspond to FIG. 4, FIG. 21, FIG. 10, and FIG. 17 of Japanese Patent Application No. 2008-156231 respectively), the functional structure of the variable transfer ratio mechanism controlling ECU 9 will be explained briefly. FIGS. 4A and 4B show values of a correction factor $K_1$ which is set corresponding to absolute values of a steering wheel angular velocity.

As shown in FIG. 13, the variable transfer ratio mechanism controlling ECU 9 (denoted by "9C" in FIG. 13) includes the CPU 9a, memories such as a ROM and a RAM (not shown), an input/output circuit (not shown) and the motor driving circuit 17 for feeding power to the transfer ratio variable motor 33 from a battery power source while being controlled by the CPU 9a. The motor driving circuit 17 is provided with the current sensor 18 for detecting an actual current value fed to the transfer ratio variable motor 33.

The ROM described above stores a variable transfer ratio controlling program and data and the CPU 9a executes the program to realize the respective functions shown in the functional structural block diagram of FIG. 13.

By the way, although the functional structural block diagram of FIG. 13 does not show the steering wheel angle $\theta_h$ input to the CPU 9a, the CPU 9a has a steering wheel angular velocity calculating section (not shown) for calculating the steering wheel angular velocity $\omega_h$ every second by temporally differentiating the steering wheel angle $\theta_h$ and inputting it to a correction factor setting section 20.

First, the target transfer ratio setting section 11 sets the target transfer ratio $G_T$ corresponding to the vehicle speed VS of the vehicle, and outputs the ratio to the target motor angle setting section 12B. As shown in FIG. 2, the target motor angle setting section 12B sets the target transfer ratio $G_T$ to be small (quicken the ratio) when the vehicle speed VS is in the low vehicle speed range and to be large (slow the ratio) when the vehicle speed VS is in the high vehicle speed range.

Next, the target motor angle setting section 12B calculates and sets the target motor angle $\theta_{Tvm}$ of the transfer ratio variable motor 33 from the current steering wheel angle $\theta_h$ based on the Equation (4) to achieve the input target transfer ratio $G_T$.

The subtracting section 13 subtracts the actual motor angle $\theta_{vm}$ output from the motor angle sensor 35 from the target motor angle $\theta_{Tvm}$ and inputs a subtraction result to the position feedback controller 14 (referred to as the "position F/B controller 14" hereinafter). The position F/B controller 14 adjusts a first target current value $I_{T1}$ (referred to as a "target current value $I_{T1}$" hereinafter) so that the subtraction results in zero, that is, so that the actual motor angle $\theta_{vm}$ coincides with the target motor angle $\theta_{Tvm}$ or the transfer ratio G coincides with the target transfer ratio $G_T$, and outputs it to the multiplying section 19.

Here, the target current value $I_{T1}$ is provided with a limit value specifying an upper limit of an absolute value.

A multiplying section 19 multiplies a correction factor $K_1$, which is input from the correction factor setting section 20, by the target current value $I_{T1}$ and outputs a second target current value $I_{T2}$ (referred to as a "target current value $I_{T2}$" hereinafter) to a subtracting section 15.

The subtracting section 15 subtracts the actual current value Im flown to the transfer ratio variable motor 33 and detected by the current sensor 18 from the target current value $I_{T2}$ and inputs a subtraction result to the current feedback controller 16 (referred to as the current F/B controller 16 hereinafter). The current F/B controller 16 adjusts transfer ratio variable indicator current to be output to the motor driving circuit 17 so that the actual current value Im coincides with the target current value $I_{T2}$ and outputs the current to the motor driving circuit 17.

When the motor driving circuit 17 supplies driving current to the transfer ratio variable motor 33, the transfer ratio variable motor 33 rotates and changes the actual motor angle $\theta_{vm}$. The actual motor angle $\theta_{vm}$ detected then by the motor angle sensor 35 is output to the subtracting section 13.

The correction factor setting section 20 sets the correction factor $K_1$ to the absolute value of the steering wheel angular velocity $|\omega_h|$ with reference to data of a continuous function corresponding to the vehicle speed VS stored in ROM (see FIG. 4). The setting of this correction factor $K_1$ is performed to reduce a steering reactive force when the absolute value of the steering wheel angular velocity $|\omega_h|$ increases.

A target motor angle setting section 12C shown in FIG. 14 corresponds to a target motor angle setting section 12B shown in FIG. 13, and includes a steering state judging section 12e, a target transfer ratio changing section 12f, and a target motor angle calculating section 12g.

The steering state judging section 12e judges whether or not the steering operation of the steering wheel 2 by the driver is in the state right after an ignition switch has been turned on (IG ON) and inputs a flag indicative of the state to the target transfer ratio changing section 12f. Also, when the state is judged as that right after the IG ON, the steering state judging section 12e judges the state as the "steering stopped" state. When the state is judged as not that right after the IG ON, the steering state judging section 12e judges the state as any one of the "additional steering" "steering returning" or "steering stopped" state, and inputs the flag indicative of the state to the target transfer ratio changing section 12f.

(1) When the state is that right after IG ON, the target transfer ratio changing section 12f judges the state as the "steering stopped" state, calculates a target transfer ratio $G_X$ ($=\theta_h/\theta_p$), outputs the target transfer ratio $G_X$ to the target motor angle calculating section 12g, and continues outputting the same target transfer ratio $G_X$ to the target motor angle calculating section 12g while the flag indicative of the "steering stopped" state continues.

When the state is not that right after IG ON, the target transfer ratio changing section 12f behaves as (2)(3) described below:

(2) the target transfer ratio changing section 12f resets the flags indicative of the "steering returning" state or the "steering stopped" state after steering operation of the "additional steering" state when the flag indicates the "additional steering" state or the steering wheel indicates substantially straight-ahead driving and outputs the target transfer ratio $G_T$ set by the target transfer ratio setting section 11 corresponding to the vehicle speed VS to the target motor angle calculating section 12g as it is as the target transfer ratio $G_X$: and (3) In a case of the "steering returning" state or the "steering stopped" state after the "additional steering" state, the target transfer ratio changing section 12f sets the flag indicative of the "steering returning" state or the "steering stopped" state after the "additional steering" state, calculates the target transfer ratio $G_X(=\theta_h/\theta_p)$ determined by a ratio of the steering wheel angle $\theta_h$ to the actual pinion angle $\theta_p$ at the beginning point, outputs the target transfer ratio $G_X$ to the target motor angle calculating section 12g and continues to output the same target transfer ratio $G_X$ to the target motor angle calculating section 12g during when the "steering returning" state or the "steering stopped" continues.

The target motor angle calculating section 12g calculates the target motor angle $\theta_{Tvm}$ according the Equation (4) and by using the target transfer ratio $G_X$. However, the target transfer ratio $G_T$ is replaced to the target transfer ratio $G_X$.

By the way, setting the target transfer ratio $G_X$ as $G_X=\theta_h/\theta_p$ in the "steering returning" or the "steering stopped" steering operation state after the "additional steering" state means to adjust the target pinion angle $\theta_{TP}$ with the current actual pinion angle $\theta_p$ by changing and setting the new target transfer ratio $G_X$ from the actual pinion angle $\theta_p$ which is late to follow up and the steering wheel angle $\theta_h$ even if the actual pinion angle $\theta_p$ is late to follow up the target pinion angle $\theta_{TP}$ determined corresponding to the target transfer ratio $G_X$ (the same value with the target transfer ratio $G_T$ corresponding to the vehicle speed VS set by the target transfer ratio setting section 11) because the absolute value of the steering wheel angular velocity $\omega_h$ is large in the "additional steering" operation state.

The actual motor angle $\theta_{vm}$ may not be able to quickly follow up the target motor angle $\theta_{Tvm}$ due to insufficient output torque of the transfer ratio variable motor 33 (see FIG. 12) when the driver quickly steers the steering wheel 2 (see FIG. 12) in the state of the quick ratio. Therefore, when the driver stops steering the steering wheel 2 at a time t1 shown in a prior art example in FIG. 15C, the actual motor angle $\theta_{vm}$ is continuously controlled so as to follow up the target motor angle $\theta_{Tvm}$ in the case of the prior art. Thus, the turning wheel continues to turn and the driver feels a sense of discomfort through the behavior of the vehicle and the steering reactive force. However, according to the Japanese Patent Application No. 2008-456231, when the driver stops steering the steering wheel 2 at the time t1 shown in FIG. 15D, the target motor angle $\theta_{Tvm}$ is matched with the actual motor angle $\theta_{vm}$, so that the turning wheel stops to move and the driver feels no such sense of discomfort.

However, in the comparative example, the output torque of the transfer ratio variable motor 33 is transmitted to the external gear 44 of the differential mechanism 31 via the spur gear, and even if the current transfer ratio is fixed to the target transfer ratio $G_X$ (i.e., even if the current target motor angle $\theta_{Tvm}$ is replaced by the actual motor angle $\theta_{vm}$), when the target current value $I_{T2}$ supplied to the transfer ratio variable motor 33 is set to zero, the transfer ratio variable motor 33 is rotated by force applied from the pinion shaft 3a or the steering wheel 2, and the actual motor angle $\theta_{vm}$ can not be kept. Therefore, the transfer ratio variable motor 33 is abruptly changed so that a holding torque is output. As shown in FIG. 15E of the broken thick line, when the operation of the steering wheel 2 is stopped, and the target current value $I_{T2}$ is abruptly changed to the holding torque level for holding the current actual motor angle $\theta_{vm}$ at the time t1, the actual current value Im actually supplied to the transfer ratio variable motor 33 overshoots and rebounds as indicated by the broken thin line in the area "A".

As described above, when the actual current value Im actually supplied to the transfer ratio variable motor 33 is abruptly changed, and the overshoot occurs, the output torque of the transfer ratio variable motor 33 is also abruptly changed, and the steering wheel 2 is affected through the variable transfer ratio mechanism 5. As a result, as shown in FIG. 15F, the driver feels a steering reactive force shock and a sense of discomfort.

Therefore, an object of the present invention is to provide a steering system which does not cause the driver to feel the steering reactive force shock when the operation of the steering wheel is stopped, and which enables the driver to operate the steering wheel comfortably.

SUMMARY OF THE INVENTION

In accordance with a first aspect of the present invention, there is provided a steering system in which a transfer ratio of a steering angle of a steering wheel to a turning angle of a turning wheel is changed by a variable transfer ratio mechanism, and an auxiliary power is generated during steering by an electric power steering, including: a transfer ratio variable motor for changing the transfer ratio, in which a steering angular velocity of the steering wheel is calculated, and when an absolute value of the steering angular velocity becomes equal to or less than a predetermined value, a current value flowing through the transfer ratio variable motor is set to zero.

According to the first aspect of the present invention, the transfer ratio does not change unnecessarily and the driver does not feel the steering reactive force shock, because when the absolute value of the steering angular velocity becomes equal to or less than the predetermined value, the current value flowing through the transfer ratio variable motor is set to zero so as not to rotate the transfer ratio variable motor.

In accordance with a second aspect of the present invention, there is provided a steering system in which a transfer ratio of a steering angle of a steering wheel to a turning angle of a turning wheel is changed by a variable transfer ratio mechanism, and an auxiliary power is generated during steering by an electric power steering, including: a transfer ratio variable motor for changing the transfer ratio, in which a steering angular velocity of the steering wheel is calculated, and when an absolute value of the steering angular velocity becomes equal to or less than a predetermined value, a current value flowing through the transfer ratio variable motor is gradually come close to zero.

According to the second aspect of the present invention, an overshoot does not occur in a position servo control of the transfer ratio variable motor and the driver does not feel the steering reactive force shock, because when the steering angular velocity becomes equal to or less than the predetermined value, the current value flowing through the transfer ratio variable motor is gradually come close to zero.

In accordance with a third aspect of the present invention, there is provided a steering system in which a transfer ratio of a steering angle of a steering wheel to a turning angle of a turning wheel is changed by a variable transfer ratio mechanism, and an auxiliary power is generated during steering by an electric power steering, including: a transfer ratio variable motor which enables the variable transfer ratio mechanism to change the transfer ratio; and an irreversible transfer unit which transfers an output torque of the transfer ratio variable motor irreversibly, in which a variable transfer ratio mechanism controlling unit for controlling a rotational angle of the transfer ratio variable motor calculates a steering angular velocity of the steering wheel, and has a first correction unit for setting a first correction factor to correct a target current value fed to the transfer ratio variable motor corresponding to the steering angular velocity and for correcting the target current value, and a second correction unit for setting a second correction factor to correct the target current value fed to the transfer ratio variable motor based on a function which varies from 0 to 1 when a absolute value of the steering angular velocity is a value from zero to a predetermined value.

According to the third aspect of the present invention, because the target current value fed to the transfer ratio variable motor can be corrected by setting the first correction factor corresponding to the steering angular velocity of the steering wheel by the first correction unit, for example, as the absolute value of the steering angular velocity is increased, the target current value is decreased, and an increase in the steering reactive force can be suppressed against a abrupt operation of the steering wheel.

Also, because the output torque of the transfer ratio variable motor of the variable transfer ratio mechanism is transferred irreversibly, even if an overshoot occurs in an actual current by abrupt setting the target current value fed to the transfer ratio variable motor to zero by the second correction unit, the driver does not feel the steering reactive force shock because an abrupt change in the output torque of the transfer ratio variable motor is not well transferred to a rotary shaft of the steering wheel.

For example, by using a worm gear as the irreversible transfer unit to output a torque of the transfer ratio variable motor, and by using a worm wheel gear to receive the torque, the driver does not feel the steering reactive force shock because an abrupt change in the output torque caused by an overshoot current of the transfer ratio variable motor is little transferred to the worm wheel gear side. Also, even if the current fed to the transfer ratio variable motor is set to zero, the transfer ratio variable motor is not rotated in an operation from the steering wheel side due to the irreversible transfer unit, and the transfer ratio does not change unnecessarily.

In accordance with a fourth aspect of the present invention, in addition to the third aspect of the present invention, the variable transfer ratio mechanism controlling unit further includes: a steering state judging unit for judging a steering state based on the steering angle and the steering angular velocity of the steering wheel, in which the second correction unit has a plurality types of functions which vary from 0 to 1 when the absolute value of the steering angular velocity is a value from zero to a predetermined value, the second correction unit sets the second correction factor based on a selected function from the plurality types of functions corresponding to the steering state judged by the steering state judging unit, and the target current value is corrected.

According to the fourth aspect of the present invention, when the absolute value of the steering angular velocity of the steering wheel is changed in the vicinity of zero by the second correction unit corresponding to the steering state (for example, "additional steering", "steering returning", or "steering stopped"), the second correction factor may change from 0 to 1 smoothly, may jump from 0 to 1 abruptly, or may drop from 1 to 0 abruptly, and a responsively of the transfer ratio variable motor can be improved.

BRIEF DESCRIPTION OF THE DRAWINGS

The object and features of the present invention will become more readily apparent from the following detailed description taken in conjunction with the accompanying drawings in which:

FIG. 3 is a functional structural block diagram of the variable transfer ratio mechanism controlling ECU;

DESCRIPTION OF PREFERRED EMBODIMENTS

First Embodiment

Next, with reference to FIGS. 1-5, a steering system of a first embodiment according to the present invention will be explained.
(Steering System)

First, with reference to FIGS. 1-3, the whole structure of the steering system will be explained.

Figure 1:
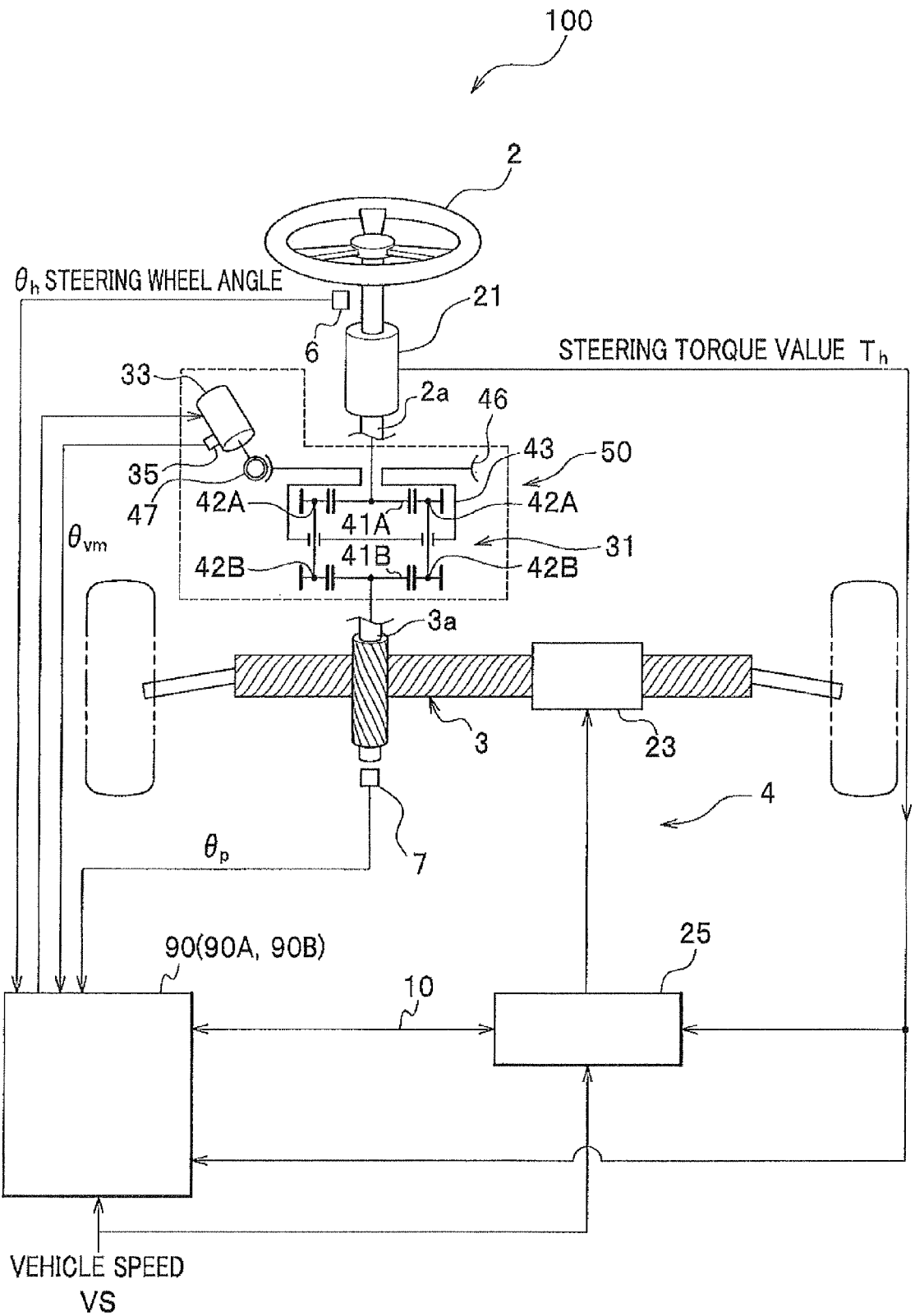
FIG. 1 is a structural block diagram of the steering system of the first embodiment.

FIG. 1 is a structural block diagram of the steering system of the first embodiment. FIG. 2 is a graph indicating a value of a target transfer ratio set corresponding to vehicle speed, and FIG. 3 is a functional structural block diagram of the variable transfer ratio mechanism controlling ECU.

As shown in FIG. 1, the steering system 100 is provided with a steering wheel 2, a rack & pinion mechanism 3, an electric power steering unit (electric power steering) 4, and a variable transfer ratio mechanism 50.

The electric power steering unit 4 has a torque sensor 21 for detecting a steering torque applied to a rotary shaft 2a of the steering wheel 2, an EPS motor 23 for driving a rack to change the turning angle of the turning wheel and generating the auxiliary power, an EPS ECU 25 for controlling and driving the EPS motor 23.

The variable transfer ratio mechanism 50 has a differential mechanism 31 linked respectively with the rotary shaft 2a of the steering wheel 2 and the rack & pinion mechanism 3, a transfer ratio variable motor 33 for turning a worm wheel gear 46 linked with a carrier 43 of a differential mechanism 31 via a worm gear 47 (i.e., the output gear) to change the transfer ratio of the steering wheel angle (the steering angle) to the turning angle of the turning wheel, and a variable transfer ratio mechanism controlling ECU (variable transfer ratio mechanism controlling unit) 90 for driving and controlling the transfer ratio variable motor 33.

In addition, although the variable transfer ratio mechanism controlling ECU is denoted by "90A" in the first embodiment (see FIG. 3) and is denoted by "90B" in the second embodiment (see FIG. 8) as described below, "90" is used here to denote the variable transfer ratio mechanism controlling ECU.

Also, the same reference numbers are used to denote the same components in comparative examples described above.

The torque sensor 21 is provided between the steering wheel 2 and the differential mechanism 31 to detect the steering torque applied to the rotary shaft 2a of the steering wheel 2 and inputs a steering torque value $T_h$ to the EPS ECU 25.

The steering torque value $T_h$ is utilized for determining the direction and magnitude of the auxiliary power, specifically, an EPS indicator current, in the EPS ECU 25. In the driving circuit (not shown) for the EPS motor 23 included in the EPS ECU 25, the EPS indicator Duty is generated based on the EPS indicator current for driving the EPS motor 23 by PWM.

A 2-stage planetary gear is used for the differential mechanism 31 of the variable transfer ratio mechanism 50. The rotary shaft 2a of the steering wheel 2 is connected to an upper-stage sun gear 41A, and a pinion shaft 3a is connected to a lower-stage sun gear 41B. A planetary gear 42A engaged with the upper-stage sun gear 41A is linked to a planetary gear 42B engaged with the lower-stage sun gear 41B via a common rotary shaft, and the rotary shaft is supported by a bearing of the carrier 43. The carrier 43 is extended radially outward, and is further extended toward the rotary shaft 2a of the steering wheel 2 to be connected to the worm wheel gear 46 rotatably supported by the rotary shaft 2a of the steering wheel 2. The worm wheel gear 46 is engaged with the worm gear 47 fixed to a rotor axis of the transfer ratio variable motor 33.

Here, a "irreversible transfer unit" in claims is composed of the worm wheel gear 46 and the worm gear 47.

The transfer ratio variable motor 33 is provided with a motor angle sensor 35 for detecting an actual motor angle (i.e., a rotational angle) $\theta_{vm}$ of its rotor shaft and its signal is input to the variable transfer ratio mechanism controlling ECU 90A.

In the present embodiment, the variable transfer ratio mechanism controlling ECU 90A uses the pinion angle $\theta_p$ that is a rotational angle of the pinion shaft 3a uniquely corresponding to the turning angle, instead of the turning angle, in setting the ratio (transfer ratio) G of the steering wheel angle $\theta_h$ of the steering wheel 2 to the turning angle of the turning wheel. To that end, a pinion angle sensor 7 for detecting the pinion angle $\theta_p$ is provided in a gear box (not shown) storing the rack & pinion mechanism 3 and its signal is input to the variable transfer ratio mechanism controlling ECU 90A.

In addition, according to an Equation (1) described above, the pinion angle $\theta_p$ may be calculated from the steering wheel angle $\theta_h$ and the actual motor angle $\theta_{vm}$.

Still more, vehicle speed VS obtained by a vehicle speed sensor (not shown) is input to the variable transfer ratio mechanism controlling ECU 90A through the communication line 10 for example.

Figure 2:
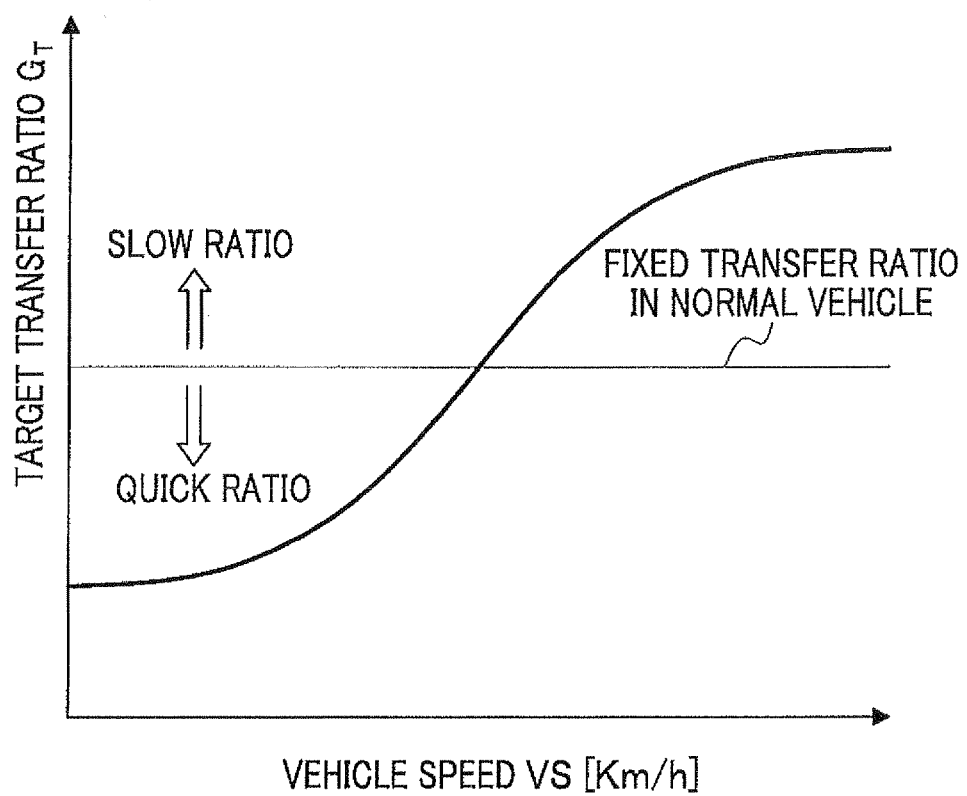
FIG. 2 is a graph indicating a value of a target transfer ratio set corresponding to vehicle speed.

Then, as shown in FIG. 2, the variable transfer ratio mechanism controlling ECU 90A sets the target transfer ratio $G_T$ to be small (quicken the ratio) when the vehicle speed VS is in the low vehicle speed range and to be large (slow the ratio) when the vehicle speed VS is in the high vehicle speed range and controls a target current value for controlling the current flowing through the transfer ratio variable motor 33 so that the transfer ratio coincides with the target transfer ratio $G_T$.

The steering wheel 2 is linked to the variable transfer ratio mechanism 50 and the rotation of the pinion shaft 3a output from the variable transfer ratio mechanism 50 is linked with assistance of rotation of the pinion shaft 3a given by the electric power steering unit 4, so that it is possible to increase or decrease the pinion angle $\theta_p$ by superimposing the actual motor angle $\theta_{vm}$ of the transfer ratio variable motor 33 to the steering wheel angle $\theta_h$. The above Equation (1) holds among the pinion angle $\theta_p$, the steering wheel angle $\theta_h$ and the actual motor angle $\theta_{vm}$ due to the mechanical restriction, and the target motor angle $\theta_{Tvm}$ of the transfer ratio variable motor 33 can be calculated as the above Equation (4).

(Variable Transfer Ratio Mechanism Controlling ECU)

Next, the functional structure of the variable transfer ratio mechanism controlling ECU 90A will be explained in detail with reference to FIGS. 3-5.

As shown in FIG. 3, the variable transfer ratio mechanism controlling ECU 90A includes the CPU 90a, memories such as a ROM and a RAM (not shown), an input/output circuit (not shown) and the motor driving circuit 17 for feeding power to the transfer ratio variable motor 33 from a battery power source while being controlled by the CPU 90a. The motor driving circuit 17 is provided with the current sensor 18 for detecting an actual current value fed to the transfer ratio variable motor 33.

The ROM described above stores a variable transfer ratio controlling program and data and the CPU 90a executes the program to realize the respective functions shown in the functional structural block diagram of FIG. 3.

By the way, although the functional structural block diagram of FIG. 3 does not show the steering wheel angle $\theta_h$ input to the CPU 90a, the CPU 90a has a steering wheel angular velocity calculating section (not shown) for calculating the steering wheel angular velocity (steering angular velocity) $\omega_h$ every second by temporally differentiating the steering wheel angle $\theta_h$ and inputting it to a correction factor setting section 20A and a correction factor setting section 38A described below.

The variable transfer ratio mechanism controlling ECU 90A controls the transfer ratio variable motor 33.

First, the target transfer ratio setting section 11 sets the target transfer ratio $G_T$ corresponding to the vehicle speed VS of the vehicle, and outputs the ratio to the target motor angle setting section 12A. As shown in FIG. 2, target motor angle setting section 12A sets the target transfer ratio $G_T$ to be small (quicken the ratio) when the vehicle speed VS is in the low vehicle speed range and to be large (slow the ratio) when the vehicle speed VS is in the high vehicle speed range.

Next, the target motor angle setting section 12A calculates and sets the target motor angle $\theta_{Tvm}$ of the transfer ratio variable motor 33 from the current steering wheel angle $\theta_h$ based on the Equation (4) to achieve the input target transfer ratio $G_T$.

The subtracting section 13 subtracts the actual motor angle $\theta_{vm}$ output from the motor angle sensor 35 from the target motor angle $\theta_{Tvm}$ and inputs a subtraction result to the position F/B controller 14. The position F/B controller 14 adjusts the target current value so that the subtraction result is zeroed, that is, so that the actual motor angle $\theta_{vm}$ coincides with the target motor angle $\theta_{Tvm}$ or the transfer ratio G coincides with the target transfer ratio $G_T$, and outputs it to the multiplying section 19.

Here, the target current value $I_{T1}$ is provided with a limit value specifying an upper limit of an absolute value.

A multiplying section 19 multiplies a correction factor $K_1$, which is input from the correction factor setting section 20A, by the target current value $I_{T1}$, which is input from the position F/B controller 14, and outputs the target current value $I_{T2}$ to a multiplying section 37.

Here, a "first correction unit" in claims is composed of the correction factor setting section 20A and the multiplying section 19.

The multiplying section 37 multiplies a correction factor $K_2$, which is input from the correction factor setting section 38A, by the target current value $I_{T2}$, which is input from the multiplying section 19, and outputs a third target current value In (referred to as a "target current value $I_{T3}$" hereinafter) to the subtracting section 15.

Here, a "second correction unit" in claims is composed of the correction factor setting section 38A and the multiplying section 37.

The functions of the correction factor setting section 20A and the correction factor setting section 38A will be explained in detail below.

The subtracting section 15 subtracts the actual current value Im flown to the transfer ratio variable motor 33 and detected by the current sensor 18 from the target current value In and inputs a subtraction result to the current F/B controller 16. The current F/B controller 16 adjusts transfer ratio variable indicator current to be output to the motor driving circuit 17 so that the subtraction result is zeroed, i.e., so that the actual current value Im coincides with the target current value $I_{T2}$ and outputs the current to the motor driving circuit 17.

When the motor driving circuit 17 supplies driving current to the transfer ratio variable motor 33, the transfer ratio variable motor 33 rotates and changes the actual motor angle $\theta_{vm}$. The actual motor angle $\theta_{vm}$ detected then by the motor angle sensor 35 is output to the subtracting section 13.

As described above, because the feedback of the actual motor angle $\theta_{vm}$ and the feedback of the actual current value Im are performed, the actual motor angle $\theta_{vm}$ can coincide with the target motor angle $\theta_{Tvm}$. In other words, the transfer ratio G can coincide with the target transfer ratio $G_T$.

(Correction Factor Setting Section 20A)

Next, with reference to FIG. 4, the function of the correction factor setting section 20A will be explained. FIGS. 4A and 4B show example values of the correction factors $K_1$ which are first correction factors set corresponding to the absolute value of the steering wheel angular velocity.

The variable transfer ratio mechanism controlling ECU 90A of this embodiment has a data 20a of the correction factor $K_1$ in the correction factor setting section 20A (see FIG. 3), and the correction factor $K_1$ is set in the correction factor setting section 20A so that the steering reactive force of the steering wheel 2 is reduced when the absolute value of the steering wheel angular velocity $|\omega_h|$ is increased by abruptly operation of the steering wheel 2 (see FIG. 1).

Figure 4A:
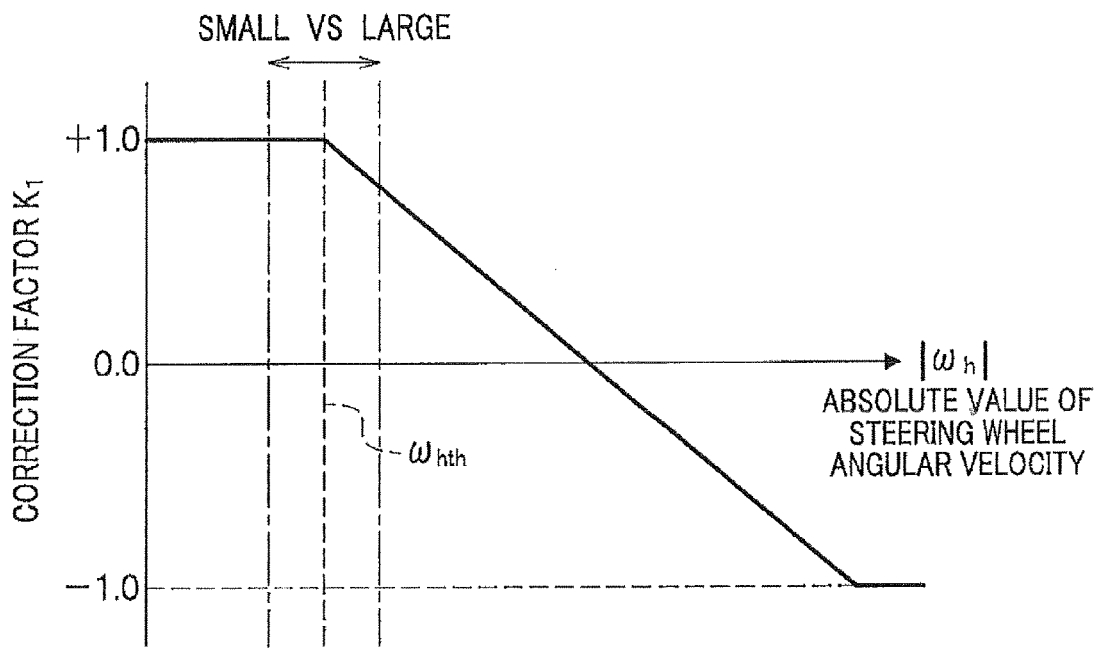
FIGS. 4A and 4B show example values of correction factors $K_1$ which are first correction factors set corresponding to absolute values of steering wheel angular velocities.

In one example of the data 20a of the correction factor $K_1$ of the continuous function which determines the correction factor $K_1$ whose variable is the absolute value of the steering wheel angular velocity $|\omega_h|$ shown in FIG. 4A, it represents characteristics that the correction factor $K_1=+1.0$ when the absolute value $|\omega_h|$ of the steering wheel angular velocity is a value from zero to the predetermined threshold value $\omega_{hth}$, that the correction factor $K_1$ decreases when the value exceeds the predetermined threshold value $\omega_{hth}$ and that the correction factor $K_1$ saturates at $-1.0$ when the value reaches to $-1.0$.

Permitting a minus value as the correction factor $K_1$ permits the resultant target current value $I_{T2}$ to be reversible from a direction of the target current value $I_{T1}$. That is, it permits the target motor angle $\theta_{Tvm}$ of the transfer ratio variable motor 33 in the quick ratio direction to be changed to the target motor angle $\theta_{Tvm}$ of the transfer ratio variable motor 33 in the slow ration direction and thus reduces steering reactive force.

Here, the threshold value $\omega_{hth}$ changes corresponding to the vehicle speed VS and the value of the threshold value $\omega_{hth}$ is set such that the smaller the vehicle speed VS, the smaller the value of the threshold value $\omega_{hth}$ is and the larger the vehicle speed VS, the larger the value of the threshold value $\omega_{hth}$ is.

This is because the EPS motor 23 of the electric power steering unit 4 has a tendency to be unable to follow up the target transfer ratio $G_T$ even if the absolute value $|\omega_h|$ of the steering wheel angular velocity is small when the degree of the quick ratio is strong because the target transfer ratio $G_T$ set by the target transfer ratio setting section 11 is set such that the smaller the vehicle speed VS, the smaller the target transfer ratio $G_T$ is, i.e., to the quick ratio side.

It is noted that the inclination of the correction factor $K_1$ in the range in which the absolute value $|\omega_h|$ of the steering wheel angular velocity exceeds the predetermined threshold value $\omega_{hth}$ may be also changed corresponding to the vehicle speed VS.

Figure 4B:
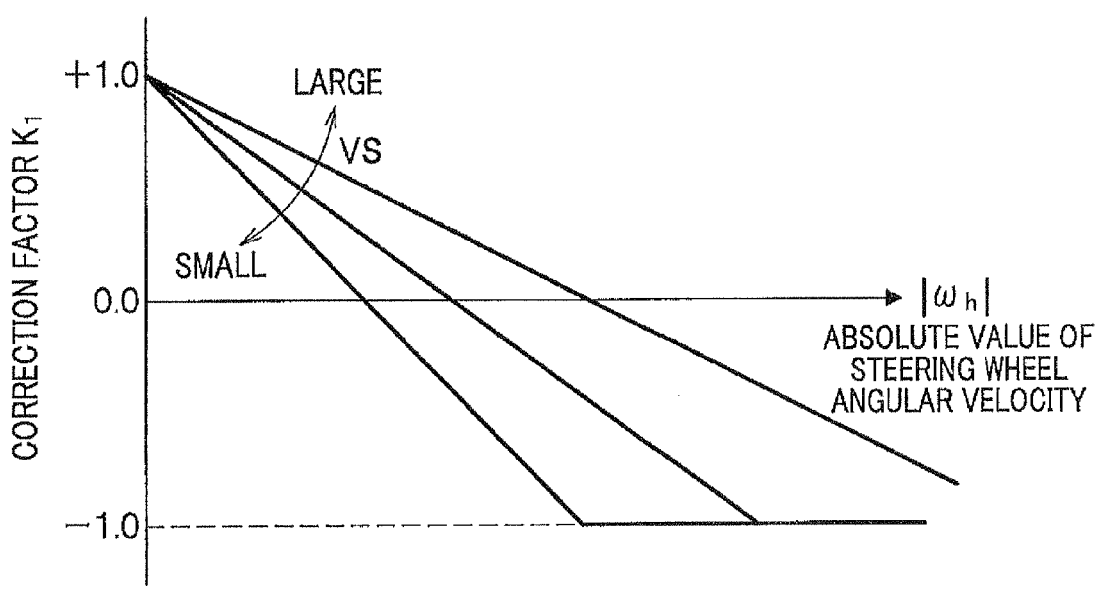

In another example of the data 20a of the correction factor $K_1$ of the continuous function which determines the correction factor $K_1$ whose variable is the absolute value of the steering wheel angular velocity $|\omega_h|$ shown in FIG. 4B, the continuous function determining the correction factor $K_1$ whose variable is the absolute value of the steering wheel angular velocity $|\omega_h|$ shows such characteristics that the correction factor $K_1$ monotonously and linearly decreases from 1.0 when the absolute value $|\omega_h|$ increases and that correction factor $K_2$ saturates at −1.0 when the absolute value reaches to −1.0.

Permitting a minus value as the correction factor $K_1$ permits the resultant target current value $I_{T2}$ to be reversible from the direction of the target current value $I_{T1}$. That is, it permits the target motor angle $\theta_{Tvm}$ of the transfer ratio variable motor 33 in the quick ratio direction to be changed to the target motor angle $\theta_{Tvm}$ of the transfer ratio variable motor 33 in the slow ration direction and thus reduces steering reactive force.

Here, a value of minus inclination of the straight line along which the correction factor $K_1$ monotonously reduces changes corresponding to the vehicle speed VS and is set such that the smaller the vehicle speed VS, the larger its absolute value is and the larger the vehicle speed VS is, the smaller its absolute value is.

This means that because the target transfer ratio $G_T$ set in the target transfer ratio setting section 11 is set such that the smaller the vehicle speed VS, the smaller the target transfer ratio $G_T$ is, i.e., because the ratio is set on the quick ratio side. The EPS motor 23 and the transfer ratio variable motor 33 of the electric power steering unit 4 are unlikely to be able to follow up when the degree of the quick ratio is strong even if the absolute value |ph| of the steering wheel angular velocity is small. Accordingly, the correction amount is largely changed to the increase of the steering wheel angular velocity $|\omega_h|$.

The data 20a of the correction factor $K_1$ shown in FIGS. 4A and 4B is stored in the ROM described above.

(Correction Factor Setting Section 38A)

Next, with reference to FIG. 5, the function of the correction factor setting section 38A will be explained. FIGS. 5A and 5B show values of the correction factors $K_2$ which are second correction factors set corresponding to the absolute value of the steering wheel angular velocity.

The variable transfer ratio mechanism controlling ECU 90A of this embodiment has a data 38a of the correction factor $K_2$ in the correction factor setting section 38A (see FIG. 3), and the correction factor $K_2$ is set in the correction factor setting section 38A so that the feedback control which follows up the target motor angle $\theta_{Tvm}$ of the transfer ratio variable motor 33 is stopped when the absolute value of the steering wheel angular velocity $|\omega_h|$ becomes small enough after the operation of the steering wheel 2 is almost stopped (see FIG. 1).

Figure 5A:
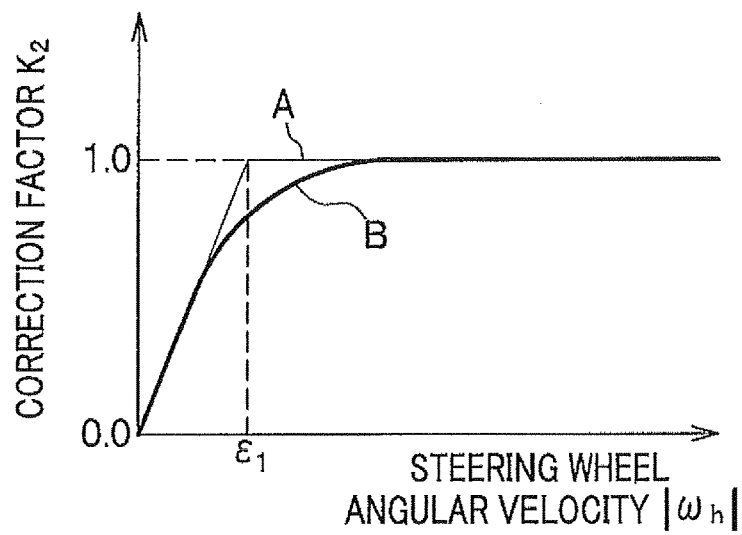
FIGS. 5A and 5B show values of correction factors $K_2$ which are second correction factors set corresponding to absolute values of steering wheel angular velocities.

In an example of a continuous function A of the data 38a of the correction factor $K_2$ which determines the correction factor $K_2$ whose variable is the absolute value of the steering wheel angular velocity $|\omega_h|$ shown in FIG. 5A by a continuous thin line, it represents characteristics that the correction factor $K_2$ linearly increases from 0.0 to +1.0 when the absolute value of the steering wheel angular velocity $|\omega_h|$ is a value form zero to a predetermined threshold value $\epsilon_1$ and that the correction factor $K_2$ saturates at +1.0 when the absolute value of the steering wheel angular velocity $|\omega_h|$ exceeds the threshold value $\epsilon_1$.

Also, in an example of a continuous function B of the data 38a of the correction factor $K_2$ which determines the correction factor $K_2$ whose variable is the absolute value of the steering wheel angular velocity $|\omega_h|$ shown in FIG. 5A by a continuous thick line, it represents characteristics that the correction factor $K_2$ linearly increases with the same inclination as that of the continuous function A at a rising edge from zero and that the correction factor $K_2$ smoothly changes to a saturated value +1.0 as the correction factor $K_2$ approaches +1.0.

Here, the threshold value $\epsilon_1$ is a absolute value of the steering wheel angular velocity which occurs in a dead band of the steering wheel angle $\theta_h$ when the driver operates the steering wheel 2, and is nearly equal to zero. And, the predetermined threshold value $\omega_{hth}$ is larger than the threshold value $\epsilon_1$.

An example of a discontinuous function C of a data 38a of the correction factor $K_2$ shown in FIG. 5B will be explained in a modified first embodiment.

Figure 5B:
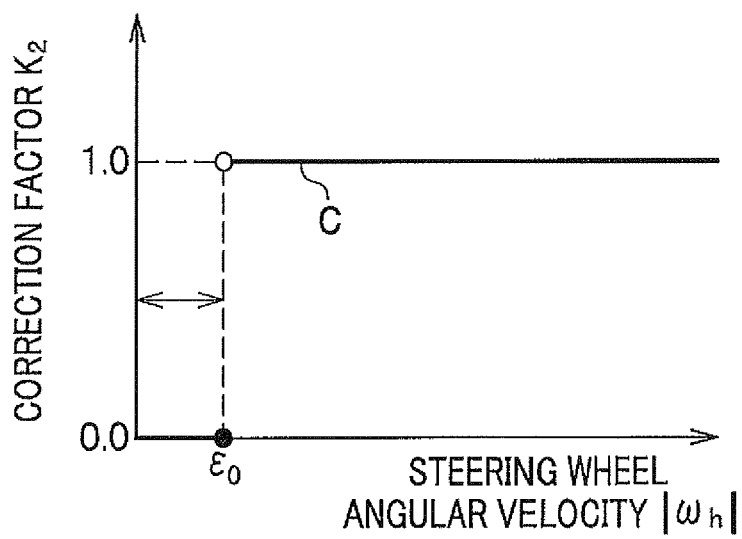

The data 38a of the correction factor $K_2$ shown in FIGS. 5A and 5B is stored in the ROM described above.

Figure 6:
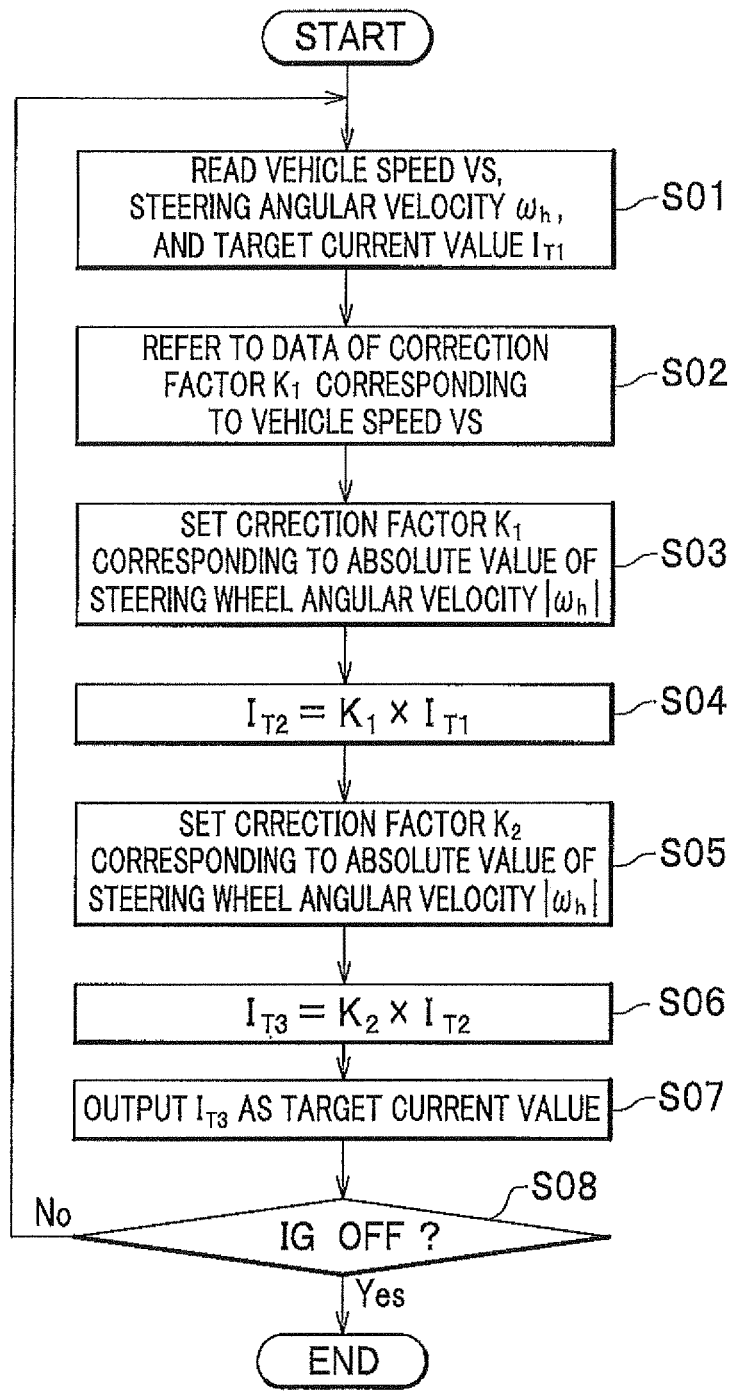
FIG. 6 is a flowchart showing a flow of correction control by a correction factor setting section 20A and a correction factor setting section 38A in the first embodiment.

FIG. 6 is a flowchart showing a flow of correction control by a correction factor setting section 20A and a correction factor setting section 38A in the first embodiment.

Steps S02 and S03 in the flowchart described below are processed in the correction factor setting section 20A, step S04 is processed in the multiplying section 19, step S05 is processed in the correction factor setting section 38A, and steps S06 and S07 are processed in the multiplying section 37. By the way, steps S01 and S08 are performed in an overall control of the CPU 90a.

When the ignition switch (IG) is turned on, the variable transfer ratio mechanism controlling ECU 90A starts, a variable transfer ratio mechanism controlling program starts in the CPU 90a (see FIG. 3), and steps S01-S08 are processed repeatedly with a constant cycle thereafter.

In step S01, the vehicle speed VS, the steering wheel angular velocity $\omega_h$, and the target current value $I_{T1}$ are read.

In step S02, the correction factor setting section 20A refers to the data 20a of the correction factor $K_1$ corresponding to the vehicle speed VS read in step S01. Specifically, for example, several kinds of continuous functions whose variable is the absolute value of the steering wheel angular velocity $|\omega_h|$ to determine the correction factor $K_1$ shown in FIG. 4A or FIG. 4B are prepared for different predetermined vehicle speeds VS, and a desirable continuous function is obtained by interpolating corresponding to the value of the vehicle speed VS read in step S01.

In step S03, the correction factor setting section 20A sets the correction factor $K_1$ corresponding to the absolute value of the steering wheel angular velocity $|\omega_h|$ read in step S01 based on a desirable continuous function to determine the correction factor $K_1$ obtained interpolating corresponding to the value of the vehicle speed VS in step S02.

In step S04, the multiplying section 19 multiplies as $I_{T2}=K_1*I_{T1}$ and outputs $I_{T2}$ to the subtracting section 15 (see FIG. 3) as a target current value.

For this reason, when the absolute value of the steering wheel angular velocity $|\omega_h|$ is large, with the assistance of the motion of the transfer ratio variable motor 33, a finite difference between the target motor angle $\theta_{Tvm}$ and the actual motor angle $\theta_{vm}$ is obtained in the subtracting section 13, and the multiplying section 19 further multiplies the target current value $I_{T1}$, which is output from the position F/B controller 14 corresponding to the finite difference, by the correction factor $K_1$ so that the driver does not feel an abrupt increase in the steering reactive force. As a result, it is possible for the driver to reduce the abrupt increase in the steering reactive force.

In step S05, the correction factor setting section 38A set the correction factor $K_2$ corresponding to the absolute value of the steering wheel angular velocity $|\omega_h|$ read in step S01. For example, the correction factor $K_2$ is set by the continuous function A or the continuous function B shown in FIG. 5A. And, in step S06, the multiplying section 37 multiplies as $I_{T3}=K_2*I_{T2}$ and outputs $I_{T3}$ to the subtracting section 15 (see FIG. 3) as a target current value (step S07).

And, the process proceeds to step S08 to check whether or not the ignition switch is turned off (IG OFF?). If the ignition switch is turned off (Yes in step S08), the series of the control ends. If not (No in step S08), the process returns to step S01 and repeats steps S01-S08.

Next, with reference to FIGS. 1, 7, and 15, an effect of control of the transfer ratio variable motor 33, when the steering wheel 2 is stopped by the variable transfer ratio mechanism controlling ECU 90A of this embodiment after operation, will be explained.

FIG. 7 shows responses of the transfer ratio variable motor in the first embodiment. FIG. 7A is a graph showing a temporal transition of the steering wheel angle $\theta_h$, FIG. 7B is a graph showing a temporal transition of the steering wheel angular velocity $\omega_h$, FIG. 7C is a graph showing a temporal transition of the target current value $I_{T3}$ and actual current value Im, FIG. 7D is a graph showing a temporal transition of the actual motor angle $\theta_{vm}$ and target motor angle $\theta_{Tvm}$ of the transfer ratio variable motor, and FIG. 7E is a graph showing a temporal transition of the steering reactive force.

Figure 15A:
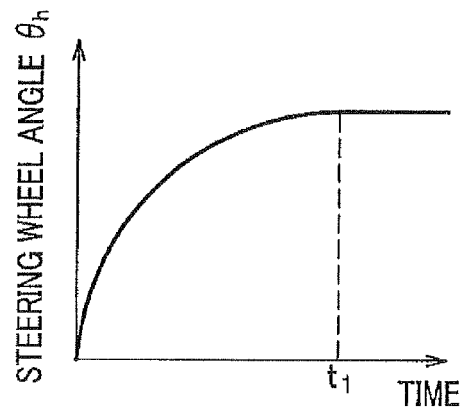
FIG. 15A shows an temporal transition of the steering wheel angle $\theta_h$.
Figure 15B:
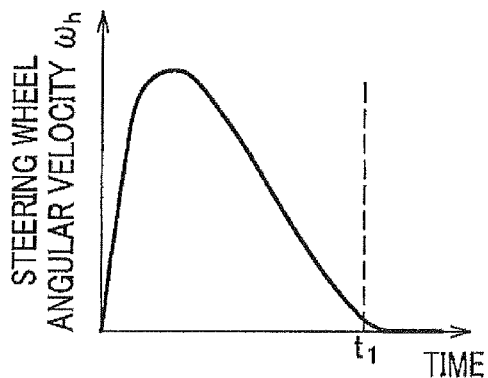
FIG. 15B shows a temporal transition of the steering wheel angular velocity $\omega_h$.
Figure 15C:
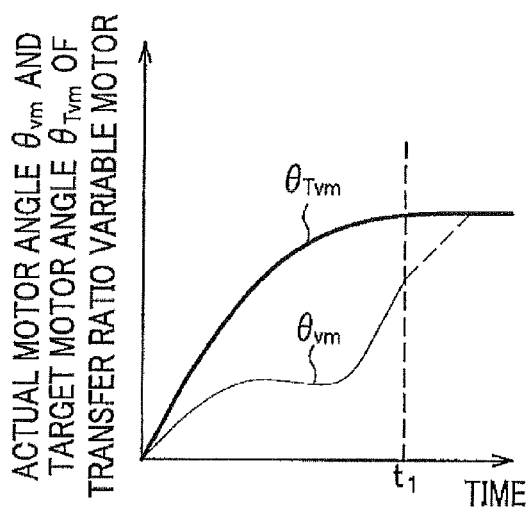
FIG. 15C shows a temporal transition in the actual motor angle $\theta_{vm}$ and the target motor angle $\theta_{Tvm}$ of the prior art transfer ratio variable motor.

The actual motor angle $\theta_{vm}$ may not be able to quickly follow up the target motor angle $\theta_{Tvm}$ due to insufficient output torque of the transfer ratio variable motor 33 (see FIG. 1) when the driver quickly steers the steering wheel 2 (see FIG. 1) in the state of the quick ratio. Therefore, when the driver stops steering the steering wheel 2 at the time t1 as shown in FIGS. 15A and 15B, the actual motor angle $\theta_{vm}$ is continuously controlled so as to follow up the target motor angle $\theta_{Tvm}$ in the case of the prior art shown in FIG. 15C. Thus, the turning wheel continues to turn and the driver feels a sense of discomfort through the behavior of the vehicle and the steering reactive force.

Figure 15D:
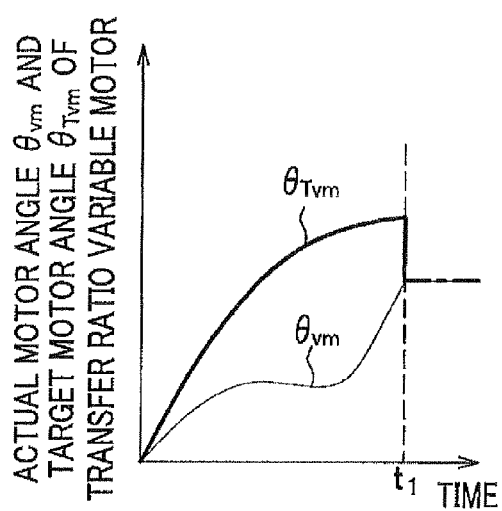
FIG. 15D shows a temporal transition in the actual motor angle $\theta_{vm}$ and the target motor angle $\theta_{Tvm}$ of the comparative example.
Figure 15E:
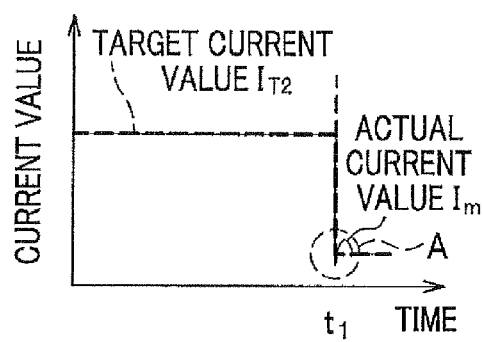
FIG. 15E shows a temporal transition of the target current value $I_{T2}$ and the actual current value Im.
Figure 15F:
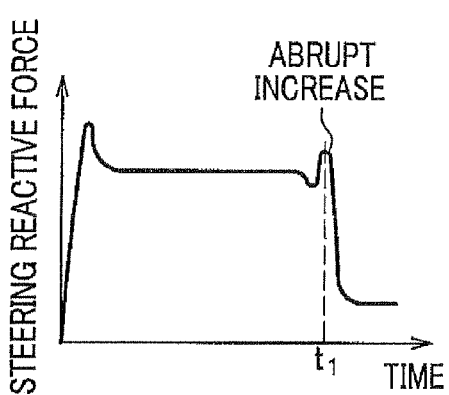
FIG. 15F shows a temporal transition of the steering reactive force.

For this reason, according to a technique disclosed in Japanese Patent Application No. 2008-156231, when the operation of the steering wheel 2 is stopped at the time t1 as shown in FIGS. 15A and 15B, target current value $I_{T2}$ (thick broken line) is abruptly controlled to be kept at its position in conformity with the current actual motor angle $\theta_{vm}$ (see FIG. 15E) so that the target motor angle $\theta_{Tvm}$ coincides with the actual motor angle $\theta_{vm}$ shown in FIG. 15D. As a result, the actual current value Im overshoots, pulses, and stabilizes as indicated by the thin solid line in the area "A" of FIG. 15E. In this case, as shown in FIG. 15F, the steering reactive force may abruptly increase at the time t1, and the driver may feel a sense of discomfort.

Figure 7A:
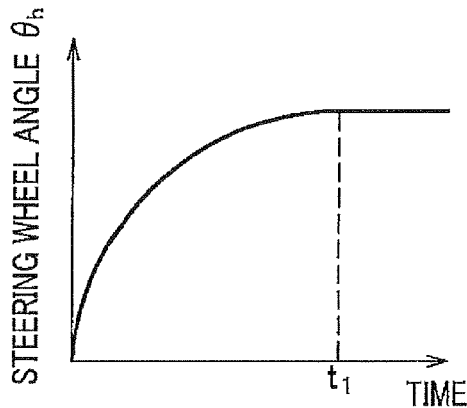
FIG. 7A is a graph showing a temporal transition of the steering wheel angle $\theta_h$.
Figure 7B:
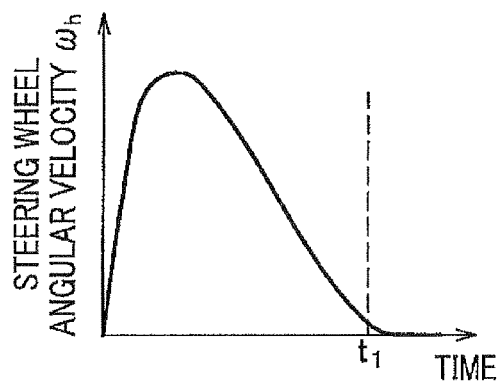
FIG. 7B is a graph showing a temporal transition of the steering wheel angular velocity $\omega_h$.

In this embodiment, when the driver quickly steers the steering wheel 2 in the state of the quick ratio (see FIG. 1) to increase the steering wheel angle $\theta_h$ in the positive direction and almost stops the steering wheel 2 at the time t1 (see FIG. 7A), the steering wheel angular velocity $\omega_h$ shown in FIG. 7B increases in the positive direction and becomes approximately zero at the time t1.

According to this embodiment, when the actual motor angle $\theta_{vm}$ is behind the target motor angle $\theta_{Tvm}$ due to insufficient output torque of the transfer ratio variable motor 33, the target current value $I_{T3}$ has the same value as that of the target current value $I_{T2}$ during steering operation of the steering wheel 2, and when the absolute value of the steering wheel angular velocity $|\omega_h|$ becomes equal to or less than the threshold value $\epsilon_1$, the correction factor $K_2$ is gradually come close to zero according to the continuous function A or the continuous function B shown in FIG. 5A.

Figure 7C:
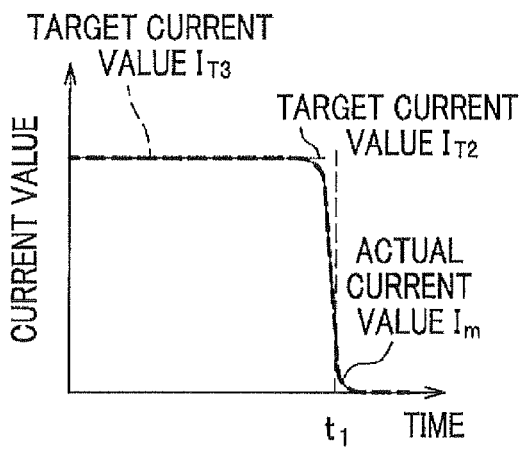
FIG. 7C is a graph showing a temporal transition of the target current value $I_{T3}$ and actual current value Im.
Figure 7D:
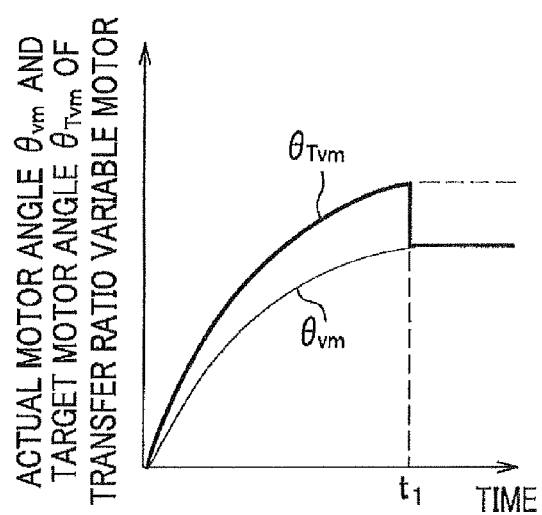
FIG. 7D is a graph showing a temporal transition of the actual motor angle $\theta_{vm}$ and target motor angle $\theta_{Tvm}$ of the transfer ratio variable motor.

As shown in FIG. 7C by the thick broken line, the target current value $I_{T3}$ begins to decrease gradually from the target current value $I_{T2}$ on and after the time t1, and becomes zero when the steering wheel 2 is stopped.

In this embodiment, because the target current value $I_{T3}$ does not become zero abruptly when the absolute value of the steering wheel angular velocity $|\omega_h|$ is equal to or less than the threshold value $\epsilon_1$, the target current value $I_{T3}$ is controlled in the subtracting section 15 and the current F/B controller 16 to be output as the actual current value Im, and the actual current value Im smoothly becomes zero without overshoot as indicated by the thin solid line in FIG. 7C.

Figure 7E:
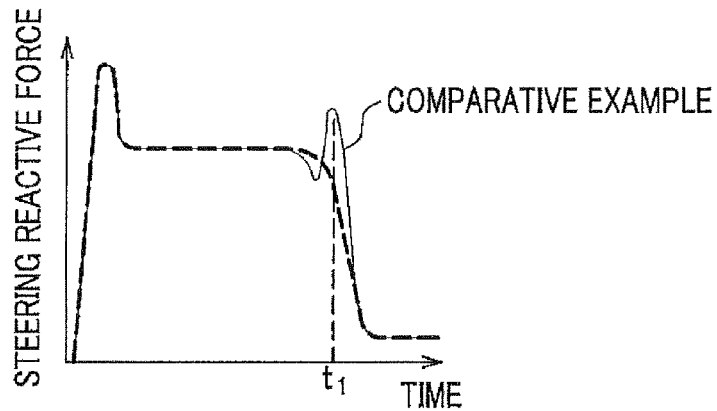
FIG. 7E is a graph showing a temporal transition of the steering reactive force.

And, as indicated by the thick broken line in FIG. 7E, at the time t1, the driver does not feel the abrupt increase in the steering reactive force via the steering wheel 2. The thin solid line indicates the steering reactive force of the comparative example. As described above, at the time t1, the driver does not feel the abrupt increase in the steering reactive force.

In this embodiment, as shown in FIG. 1, because the rotation of the transfer ratio variable motor 33 is transferred from the worm gear 47 to the worm wheel gear 46, when no current is supplied to the transfer ratio variable motor 33, the torque is not transferred (irreversibility) from the worm wheel gear 46 to the worm gear 47 even if a force is applied from the pinion shaft 3a or the steering wheel 2, and the transfer ratio is fixed as it is. Therefore, it is not necessary to keep a holding current flowing through the transfer ratio variable motor 33 in order to keep the transfer ratio at the predetermined value. As a result, energy saving is provided.

When the driver begins to steer the steering wheel 2 again and the absolute value of the steering wheel angular velocity $|\omega h|$ exceeds the predetermined threshold value $\epsilon_1$, the correction factor setting section 38A outputs the correction factor $K_2$ (=1.0) soon and the control returns to a control of a transfer ratio at a quick or slow ratio corresponding to a normal vehicle speed.

To summarize, according to this embodiment, when the driver quickly steers the steering wheel 2 with the condition that the quick ratio is set, the target current value $I_{T1}$ to achieve the quick ratio given to the transfer ratio variable motor 33 is multiplied by the correction factor $K_1$ which is less than 1.0 so that the target current value $I_{T2}$ is corrected to reduce the steering reactive force. Also, when the driver steers the steering slowly, the correction factor $K_1$ returns to 1.0 and the target current value $I_{T2}$ returns to the target current value $I_{T1}$ to achieve the quick ratio.

Also, when the steering wheel 2 is stopped after the steering wheel 2 has been steered and the absolute value of the steering wheel angular velocity $|\omega_h|$ is equal to or less than the threshold value $\epsilon_1$, the target current value $I_{T3}$ fed to the transfer ratio variable motor 33 gradually comes close to zero. Therefore, when the transfer ratio variable motor 33 can not follow up the target motor angle $\theta_{Tvm}$, the rotation of the transfer ratio variable motor 33 smoothly stops, the current transfer ratio is kept due to engagement between the worm wheel gear and the worm gear 47 even if no current is supplied to the transfer ratio variable motor 33. As a result, the sense of discomfort in which steering operation continues in spite of the fact that the steering wheel 2 is stopped, and the driver does not feel the abrupt increase in the steering reactive force via the steering wheel 2.

The technology described in JP 2000-344120 A is a method of obtaining a target transfer ratio $G_T$ by multiplying a correction factor obtained corresponding to an absolute value $|\omega_h|$ of steering wheel angular velocity or an absolute value $|T_h|$ of a steering torque value with a target transfer ratio $G_T$ set by the target transfer ratio setting section 11 corresponding vehicle speed VS. Then, it calculates a target motor angle $\theta_{Tvm}$ from the corrected target transfer ratio $G_T$ and generates a control signal to a deviation between the actual motor angle $\theta_{vm}$ and the target motor angle $\theta_{Tvm}$ to control the transfer ratio variable motor 33.

Limiting to the action of the variable transfer ratio mechanism 50, steering reactive force essentially changes directly in connection with the control signal (the target current values $I_{T1}$ and $I_{T2}$ in the present embodiment) generated with respect to the deviation between the actual motor angle $\theta_{vm}$ and the target motor angle $\theta_{Tvm}$ and relates indirectly with the target transfer ratio $G_T$, so that the present embodiment is more effective in directly controlling the steering reactive force. Accordingly, response characteristic of the present embodiment is better than that of the technology described in JP 2000-344120 A in directly suppressing the abrupt increase of the steering reactive force during the quick ratio.

Modified First Embodiment

Next, with reference to FIG. 5B, a modified first embodiment will be explained.

In the first embodiment, the data 38a of the correction factor $K_2$ used in the correction factor setting section 38A (see FIG. 3) is the continuous function A or the continuous function B shown in. FIG. 5A. However, the function is not limited to the above. A discontinuous function C whose variable is the absolute value of the steering wheel angular velocity $|\omega_h|$ shown in FIG. 5B may be used. In the example of the discontinuous function C, it represents characteristics that the correction factor $K_2=0.0$ when the absolute value of the steering wheel angular velocity $|\omega_h|$ is a value from zero to the predetermined threshold value $\epsilon_0$ which is less than the threshold value $\epsilon_1$, and the correction factor $K_2$ jumps to +1.0 and is kept at +1.0 when the absolute value of the steering wheel angular velocity $|\omega_h|$ exceeds the threshold value $\epsilon_0$.

According to this embodiment, when the driver quickly steers the steering wheel 2 and stops steering with the condition that the quick ratio is set, if the actual motor angle $\theta_{vm}$ is behind the target motor angle $\theta_{Tvm}$ due to insufficient output torque of the transfer ratio variable motor 33, the target current value $I_{T3}$ has the same value as that of the target current value $I_{T2}$ during steering operation of the steering wheel 2, and when the absolute value of the steering wheel angular velocity $|\omega_h|$ becomes equal to or less than the threshold value $\epsilon_0$, the correction factor $K_2$ jumps to zero according to the discontinuous function C shown in FIG. 5B.

In this case, because the target current value $I_{T3}$ abruptly changes from the target current value $I_{T2}$ to zero, the actual current value Im overshoots, pulses, and stabilizes at zero due to the feedback control by the subtracting section 15, and the current F/B controller 16 (not shown). However, even if the worm gear 47 which is an output gear of the transfer ratio variable motor 33 slightly overshoots, pulses, and stabilizes, the rotation of the worm wheel gear 46 is not affected. Therefore, as indicated by the thick broken line in FIG. 7E, at the time t1, the driver does not feel the abrupt increase in the steering reactive force via the steering wheel 2.

Second Embodiment

Next, with reference to FIGS. 1 and 8-11, a steering system of a second embodiment according to the present invention will be explained.

Figure 8:
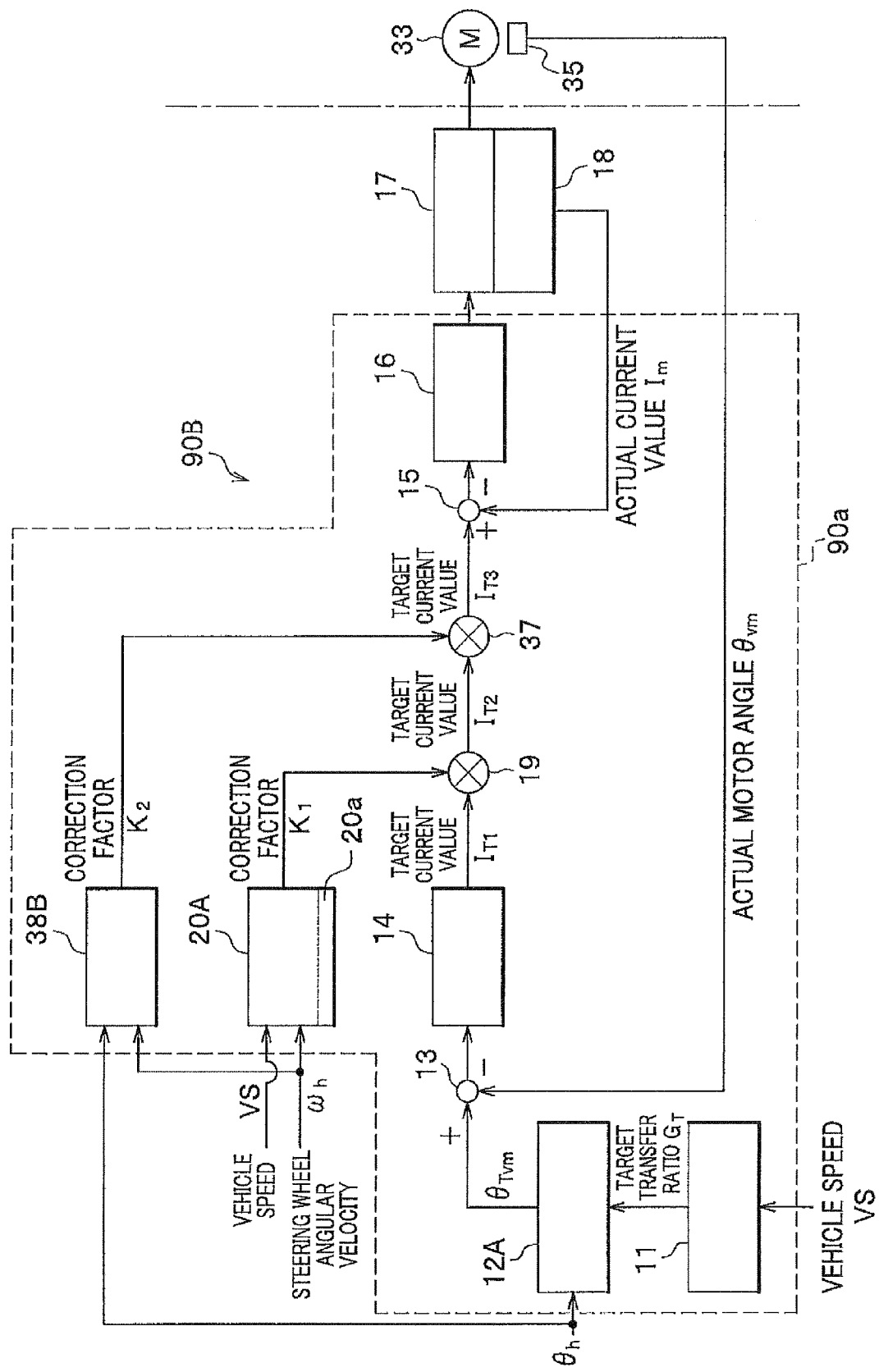
FIG. 8 is a functional structural block diagram of a steering system in a variable transfer ratio mechanism controlling ECU of this embodiment.
Figure 9:
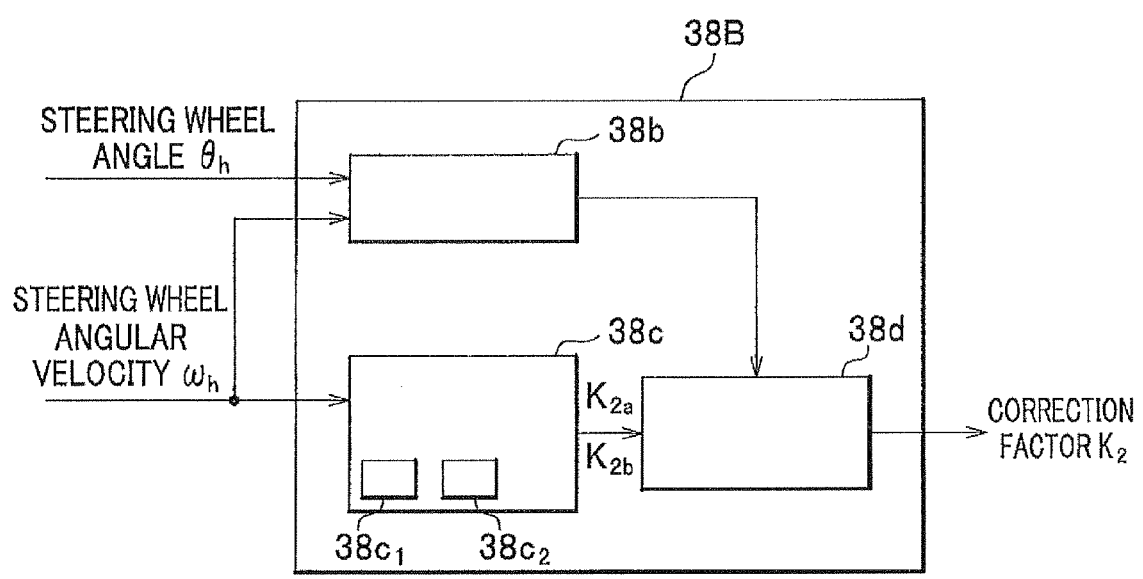
FIG. 9 is a detailed functional structural block diagram of a correction factor setting section 38B which is a second correction unit.
Figure 10A:
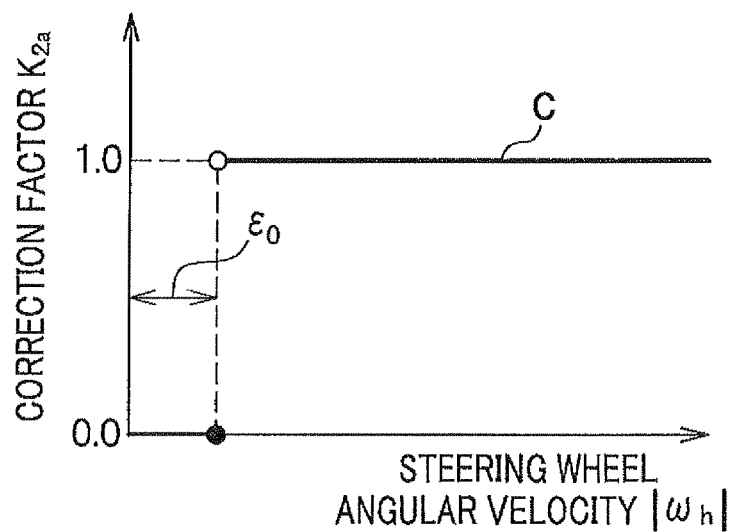
FIGS. 10A and 10B show example values of the correction factors $K_2$ which are second correction factors set corresponding to the absolute value of the steering wheel angular velocity.
Figure 10B:
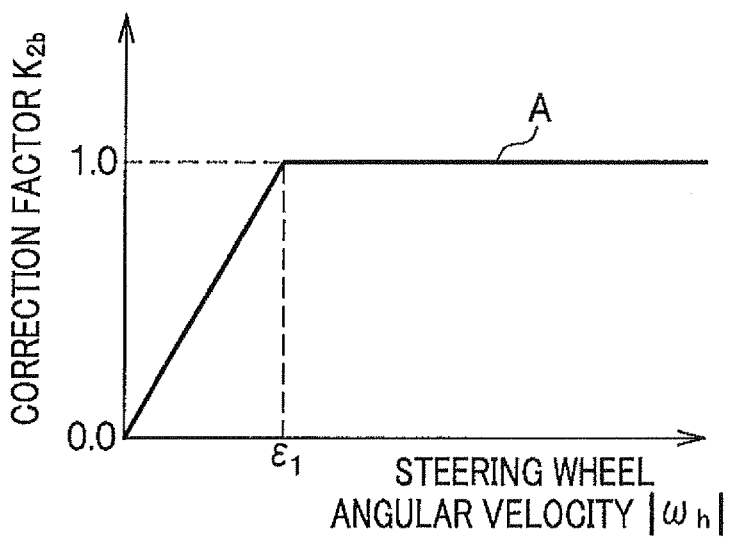
Figure 11:
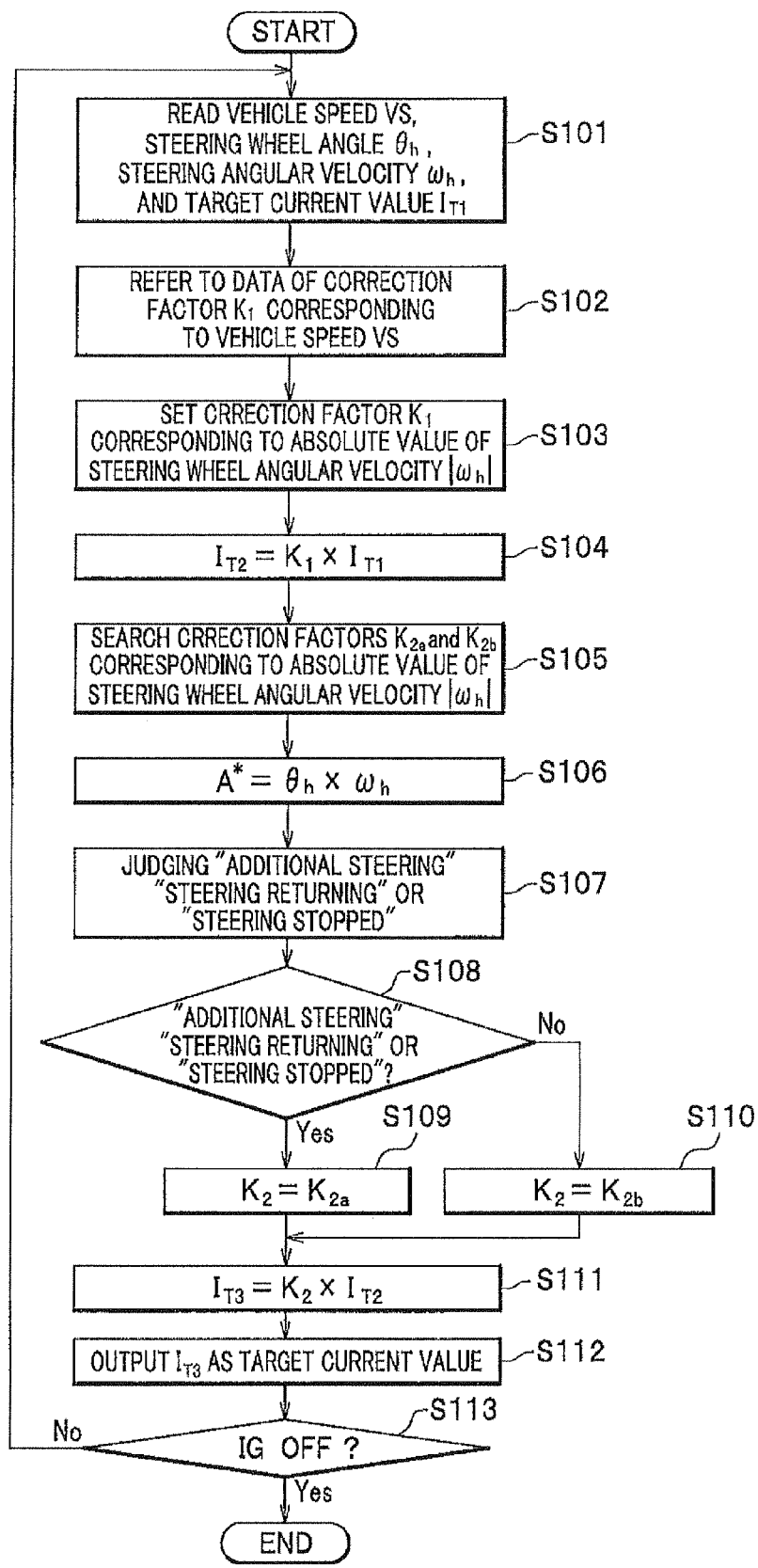
FIG. 11 is a flowchart showing a flow of correction control by a correction factor setting section 20A and a correction factor setting section 38B in the second embodiment.
Figure 12:
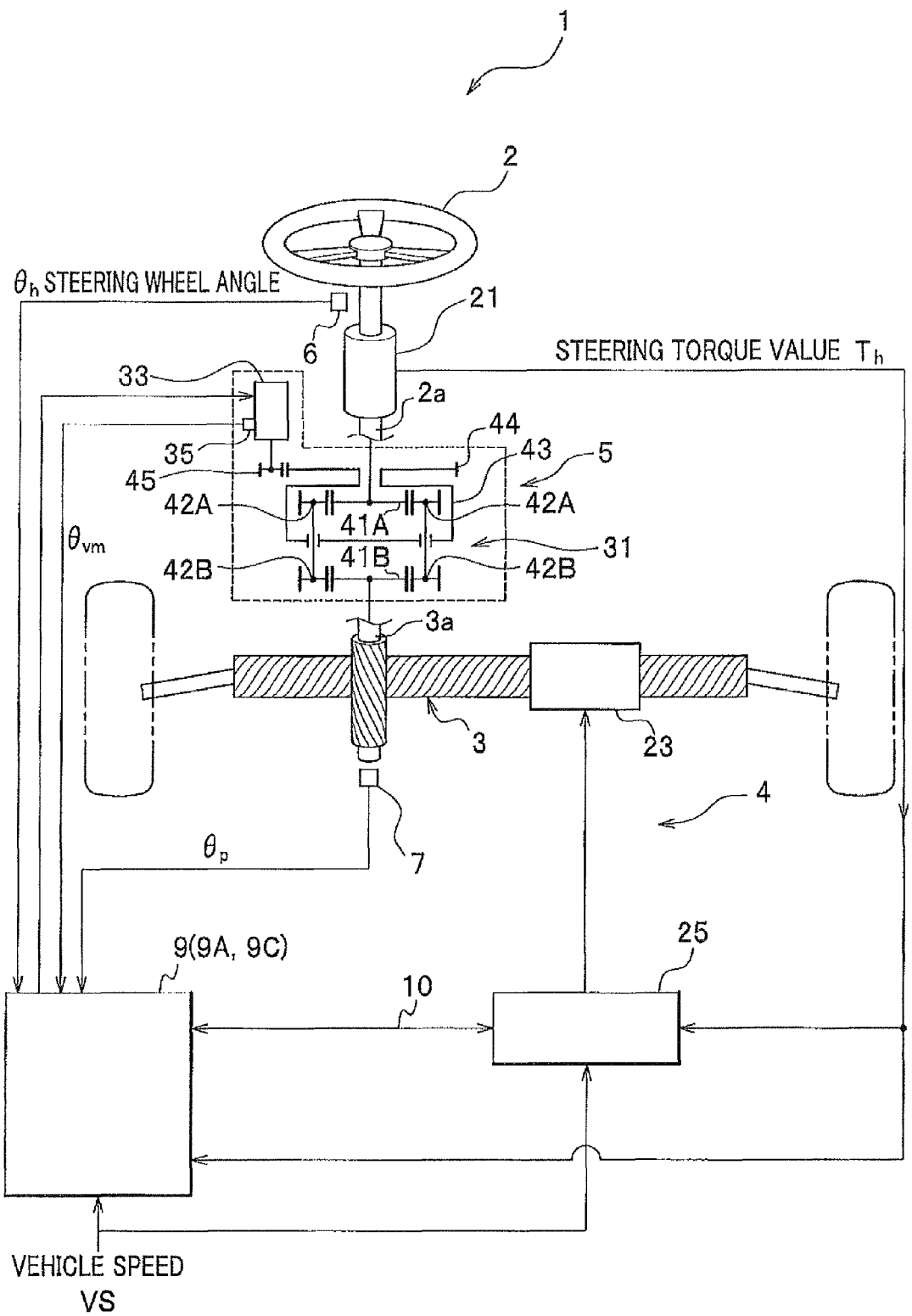
FIG. 12 is a structural block diagram of the steering system of the comparative example according to the present invention.
Figure 13:
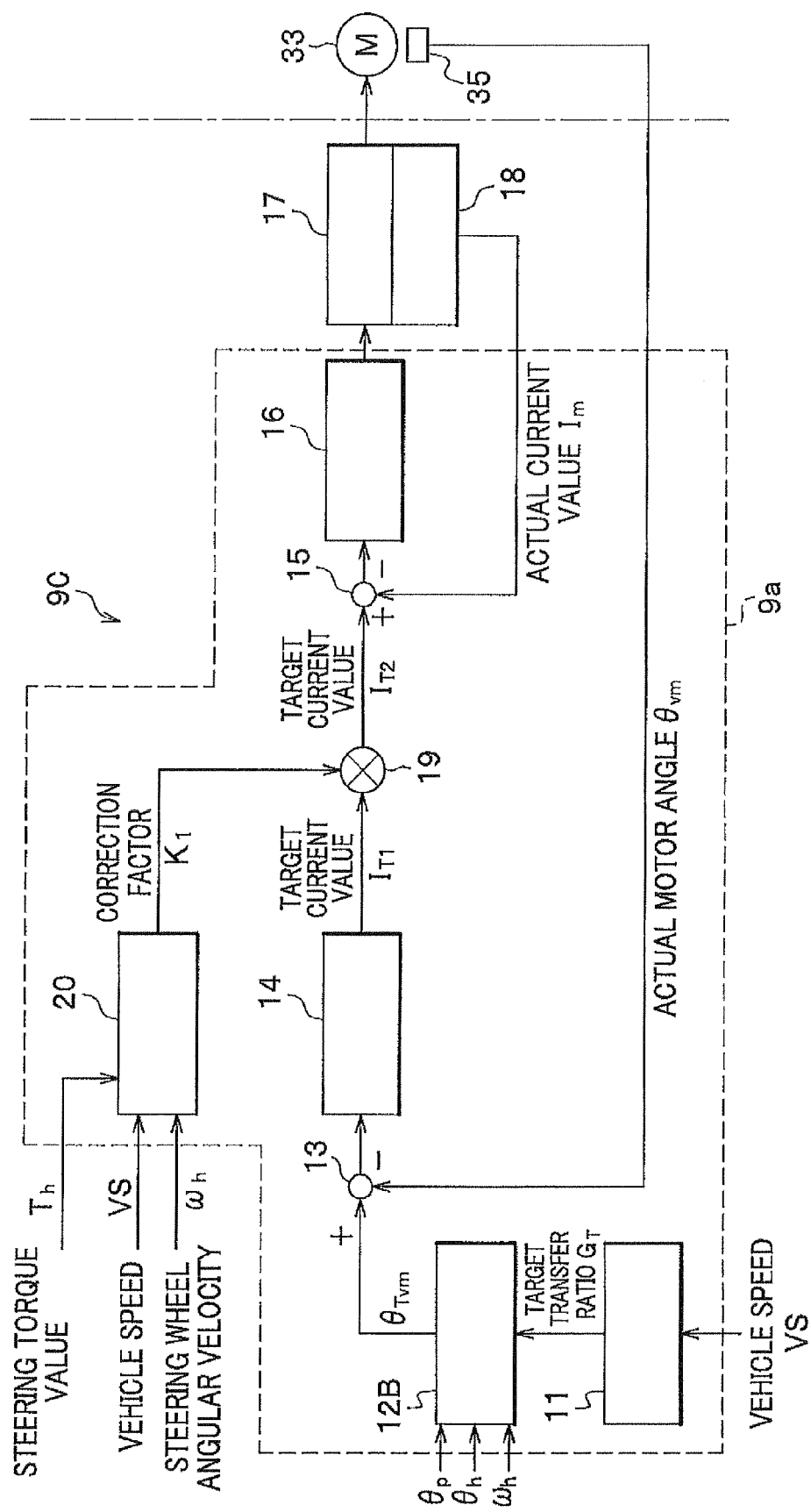
FIG. 13 is a functional structural block diagram of the variable transfer ratio mechanism controlling ECU in the comparative example.
Figure 14:
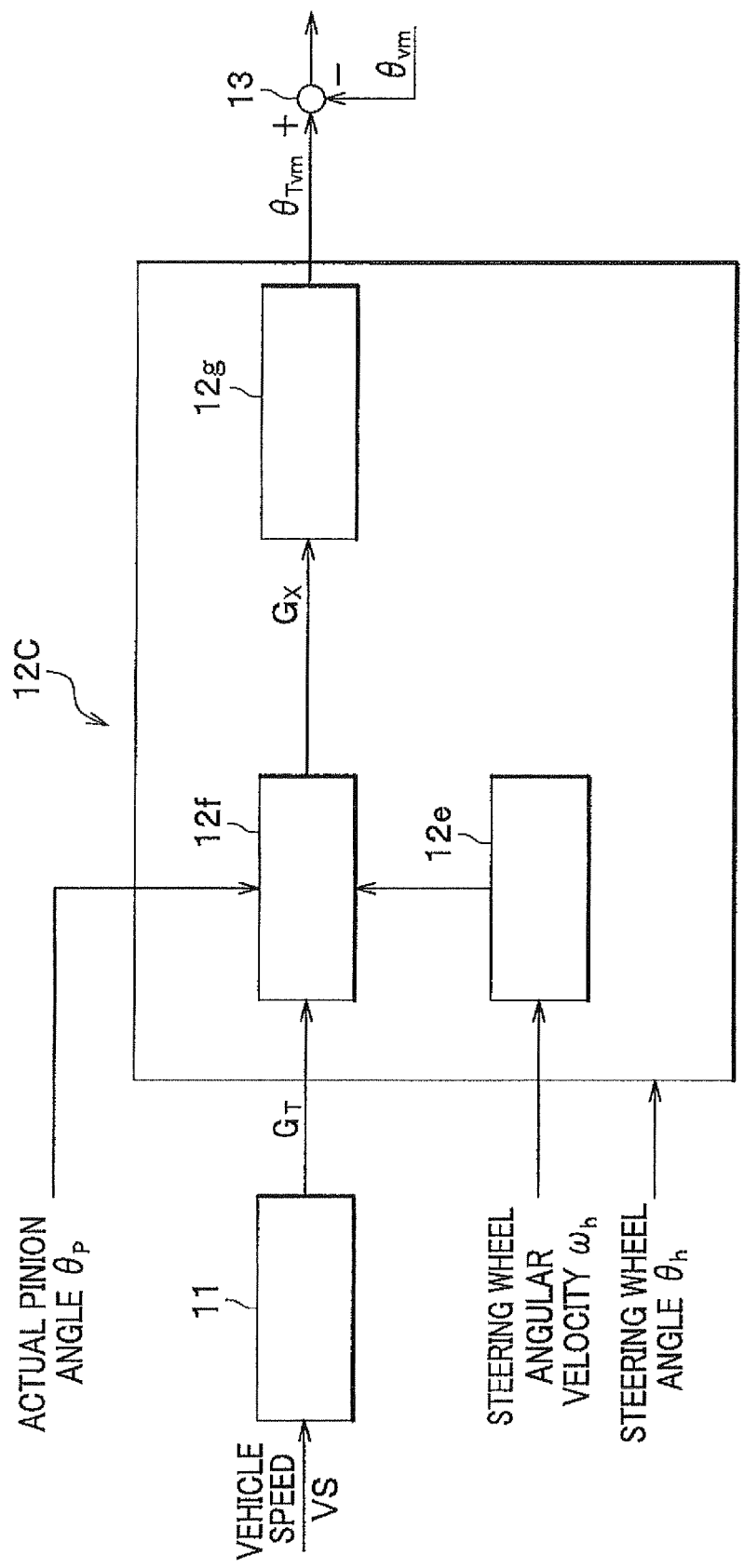
FIG. 14 is a detailed functional block diagram of the target motor angle setting section in FIG. 13.

FIG. 8 is a functional structural block diagram of a steering system in a variable transfer ratio mechanism controlling ECU of this embodiment, FIG. 9 is a detailed functional structural block diagram of a correction factor setting section 38B which is a second correction unit, and FIGS. 10A and 10B show example values of the correction factors $K_2$ which are second correction factors set corresponding to the absolute value of the steering wheel angular velocity. FIG. 11 is a flowchart showing a flow of correction control by a correction factor setting section 20A and a correction factor setting section 38B in the second embodiment.

The variable transfer ratio mechanism controlling ECU 90B of the second embodiment (see FIG. 8) differs from the variable transfer ratio mechanism controlling ECU 90A of the first embodiment (see FIG. 3) in that the correction factor setting section 38A is replaced by the correction factor setting section 38B (see FIG. 8). Other components to are the same as those of the first embodiment. Therefore, similar numerals are used to the components similar to those of the first embodiment, and detailed explanations are omitted.

Here, a "second correction unit" in claims is composed of the correction factor setting section 38B and the multiplying section 37.

As shown in FIG. 9. the correction factor setting section 38B has a steering state judging section (steering state judging unit) 38b, a table data referencing section 38c, and an output selecting section 38d.

The steering state judging section 38b judges the state of a steering of the steering wheel 2 by the driver (see FIG. 1) as any one of the "additional steering" "steering returning" or "steering stopped" based on the steering wheel angle $\theta_h$ and the steering wheel angular velocity $\omega_h$, and outputs a result to the output selecting section 38d.

By the way, a calculation of $A^* = \theta_h^* \omega_h$ is repeated in the steering state judging section 38b with a constant cycle. When $A^* > 0$ and $|\omega_h| > \epsilon_0$, the state is judged as the "additional steering". When $A^* < 0$ and $|\omega_h| > \epsilon_0$, the state is judged as the "steering returning". When $|\omega_h| \leq \epsilon_0$ for any value of $A^*$, the state is judged as the "steering stopped".

The table data referencing section 38c has data 38c1 and 38c2 of the correction factor $K_2$, the data 38c1 of the correction factor $K_2$ is a discontinuous function C which defines a correction factor $K_{2a}$ corresponding to the absolute value of the steering wheel angular velocity $|\omega_h|$ shown in FIG. 10A and is the same as the discontinuous function C of the first embodiment shown in FIG. 5B. The data 38c2 of the correction factor $K_2$ is a continuous function A which defines a correction factor $K_{2b}$ corresponding to the absolute value of the steering wheel angular velocity $|\omega_h|$ shown in FIG. 10B and is the same as the continuous function A of the first embodiment shown in FIG. 5A.

The table data referencing section 38c searches the correction factors $K_{2a}$ and $K_{2b}$ from the data 38c1 and 38c2 of the correction factor $K_2$ based on the steering wheel angular velocity $\omega_h$ to input the searched values to the output selecting section 38d respectively.

When the judgment of the "steering returning" or the "steering stopped" is input from the steering state judging section 38b, the output selecting section 38d selects the correction factor $K_{2a}$ as the correction factor $K_2$ which is the second correction factor to input it to the multiplying section 37 (see FIG. 8). When the judgment of the "additional steering" is input from the steering state judging section 38b, the output selecting section 38d selects the correction factor $K_{2b}$ as the correction factor $K_2$ which is the second correction factor to input it to the multiplying section 37.

Next, with reference to FIG. 11, a flow of the correction control by the correction factor setting section 20A and the correction control of the correction factor setting section 38B in this embodiment will be explained.

Steps S102 and S103 in the flowchart described below are processed in the correction factor setting section 20A, step S104 is processed in the multiplying section 19, steps S105-S110 are processed in the correction factor setting section 38B, and steps S111 and S112 are processed in the multiplying section 37. By the way, steps S101 and S113 are performed in an overall control of the CPU 90a.

In step S101, the vehicle speed VS, the steering wheel angle $\theta_h$, the steering wheel angular velocity $\omega_h$, and the target current value $I_{T1}$ are read.

In step S102, the correction factor setting section 20A refers to the data 20a of the correction factor $K_1$ corresponding to the vehicle speed VS read in step S101. Specifically, for example, several kinds of continuous functions whose variable is the absolute value of the steering wheel angular velocity $|\omega_h|$ to determine the correction factor $K_1$ shown in FIG. 4A or FIG. 4B are prepared for different predetermined vehicle speeds VS, and a desirable continuous function is obtained by interpolating corresponding to the value of the vehicle speed VS read in step S101.

In step S103, the correction factor setting section 20A sets the correction factor $K_1$ corresponding to the absolute value of the steering wheel angular velocity $|\omega_h|$ read in step S101 based on a desirable continuous function to determine the correction factor $K_1$ obtained interpolating corresponding to the value of the vehicle speed VS in step S102.

In step S104, the multiplying section 19 multiplies as $I_{T2}=K_1*I_{T1}$ and outputs $I_{T2}$ to the subtracting section 15 (see FIG. 8) as a target current value.

For this reason, when the absolute value of the steering wheel angular velocity $|\omega_h|$ is large, with the assistance of the motion of the transfer ratio variable motor 33 (see FIG. 1), a finite difference between the target motor angle $\theta_{Tvm}$ and the actual motor angle $\theta_{vm}$ is obtained in the subtracting section 13 (see FIG. 8), and the multiplying section 19 further multiplies the target current value $I_{T1}$, which is output from the position F/B controller 14 corresponding to the finite difference, by the correction factor $K_1$ so that the driver does not feel an abrupt increase in the steering reactive force. As a result, it is possible for the driver to reduce the abrupt increase in the steering reactive force.

In step S105, the correction factor $K_{2a}$ is searched from the data 38c1 of the correction factor $K_2$ corresponding to the absolute value of the steering wheel angular velocity $|\omega_h|$ read in step S101 and the correction factor $K_{2b}$ is searched from the data 38c2 of the correction factor $K_2$ in the table data referencing section 38c of the correction factor setting section 38B to input the searched values to the output selecting section 38d respectively (the correction factors $K_{2a}$ and $K_{2b}$ corresponding to the absolute value of the steering wheel angular velocity $|\omega_h|$ are searched).

In step S106, $A^*=\theta_h*\omega_h$ is calculated in the steering state judging section 38b of the correction factor setting section 38B based on the steering wheel angle $\theta_h$ and the steering wheel angular velocity $\omega_h$ read in step S101. Next, in step S107, the "additional steering" "steering returning" and "steering stopped" described above are judged based on the fact that whether the value $A^*$ obtained in step S106 is greater than zero and that whether the absolute value of the steering wheel angular velocity $|\omega_h|$ is equal to or less than the threshold value $\epsilon_0$, and the result is input to an output selecting section 38d of the correction factor setting section 38B.

In step S108, the fact that the state is in the "steering returning" or "steering stopped" are judged in the output selecting section 38d. If the state is in "steering returning" or "steering stopped" (Yes), the process proceeds to step S109. If not (No), the process proceeds to step S110.

In step S109, a $K_{2a}$ value of the discontinuous function C (see FIG. 10A) is selected as the correction factor $K_2$ in the output selecting section 38d so as to output the value to the multiplying section 37. In step S110, a $K_{2b}$ value of the continuous function A (see FIG. 10B) is selected as the correction factor $K_2$ in the output selecting section 38d so as to output the value to the multiplying section 37.

And, in step S111, the multiplying section 37 multiplies as $I_{T3}=K_2*I_{T2}$ and outputs $I_{T3}$ to the subtracting section 15 (see FIG. 8) as a target current value (step S112).

And, the process proceeds to step S113 to check whether or not the ignition switch is turned off (IG OFF?). If the ignition switch is turned off (Yes in step S113), the series of the control ends. If not (No in step S113), the process returns to step S101 and repeats steps S101-S113.

The effects of this embodiment is the same as those of the first and the modified first embodiments. However, because the discontinuous function C shown in FIG. 10A is used as the correction factor $K_2$ when the state is judged as "steering returning" or "steering stopped" in the correction factor setting section 38B, the transfer ratio variable motor 33 has an excellent response. That is, when the absolute value of the steering wheel angular velocity $|\omega_h|$ becomes equal to or less than the threshold value $\epsilon_0$, the correction factor $K_2$ becomes zero soon, the target current value $I_{T3}$ also becomes zero, and the transfer ratio variable motor 33 stops immediately. Also, when the absolute value of the steering wheel angular velocity $|\omega_h|$ exceeds the threshold value $\epsilon_0$, the correction factor $K_2$ becomes 1.0 soon, the transfer ratio at the time of "steering returning" is set to the quick ratio or the slow ratio so that the target current value $I_{T3}$ is set in order to be along with the target transfer ratio $G_T$ determined by the vehicle speed VS, and thereby the actual current value Im of the transfer ratio variable motor 33 is feedback controlled by the subtracting section 15 and the current F/B controller 16.

In the case of the "additional steering", because the correction factor $K_2$ is gradually set to zero at the time of the "steering stopped" thereafter, there is no abrupt increase in the steering reactive force like the first embodiment and a smooth steering can be obtained.

In the first embodiment, the modified first embodiment, and the second embodiment, the differential mechanism 31 of the variable transfer ratio mechanism using the planetary gear is assumed. However, the present invention is not limited to that. The present invention can generally be applied to a mechanism having an actuator for adjusting a steering wheel angle and a pinion angle.

Also, the electric power steering unit 4 is assumed as a steering supporting mechanism. However, the present invention is not limited to that. The present invention can similarly be applied to a hydraulic power steering system.

In addition, in the first embodiment, the modified first embodiment, and the second embodiment, the function whose variable is the steering wheel angular velocity $\omega_h$ is used as the continuous function to calculate the correction factor $K_1$. However, the present invention is not limited to that. A continuous function whose variable is the steering torque value $T_h$, the indicator current generated in the EPS ECU 25 of the EPS motor 23, or the Duty signal generated by the indicator current may be used.

What is claimed is:

1. A steering system wherein a transfer ratio of a steering angle of a steering wheel to a turning, angle of a turning wheel is changed by a variable transfer ratio mechanism, and an auxiliary power is generated during steering by an electric power steering, comprising:
   a transfer ratio variable motor for changing the transfer ratio, the transfer ratio variable motor being provided in the variable transfer ratio mechanism, and
   a variable transfer ratio mechanism controlling unit for controlling a rotational angle of the transfer ratio variable motor, wherein the variable transfer ratio mechanism controlling unit calculates a steering angular velocity of the steering wheel, and includes
      a first correction unit for setting a first correction factor to correct a target current value fed to the transfer ratio variable motor in such a manner that the first correction factor becomes smaller as the steering angular velocity becomes larger, and for correcting the target current value,
      a second correction unit for setting a second correction factor to correct the target current value fed to the transfer ratio variable motor based on a continuous function which continuously varies from 0 to 1 as an absolute value of the steering angular velocity changes from zero to a first non-zero predetermined value, and for correcting the target current value,
   the variable transfer ratio mechanism controlling unit is configured to control the transfer ratio variable motor in such a manner that, when the absolute value of the steering angular velocity is equal to or less than the first non-zero predetermined value, a current value flowing through the transfer ratio variable motor gradually comes close to zero.

2. The steering system according to claim 1, wherein the variable transfer ratio mechanism controlling unit further comprising:
   a steering state judging unit for judging a steering state based on the steering angle and the steering angular velocity of the steering wheel,
   wherein the second correction unit has a plurality types of continuous functions which continuously vary from 0 to 1 when the absolute value of the steering angular velocity is a value from zero to the first non-zero predetermined value,
   the second correction unit sets the second correction factor based on a selected function from the plurality types of functions corresponding to the steering state judged by the steering state judging unit, and the target current value is corrected.

3. The steering system according to claim 1, wherein
   the first correction value has a linear characteristic that continuously varies from −1 to 1 depending on the absolute, value of the steering angular velocity, the first correction value being set at 1 when the absolute value of the steering angular velocity is from zero to a second non-zero predetermined value,
   the second non-zero predetermined value is set so as to vary according to a vehicle speed.

4. The steering system according to claim 1, wherein
   the first correction value has a linear characteristic that continuously varies from −1 to 1 depending on the absolute value of the steering angular velocity,
   an inclination of the linear characteristic is set so as to vary according to a vehicle speed.

* * * * *